United States Patent
Shih et al.

(10) Patent No.: US 11,427,688 B2
(45) Date of Patent: Aug. 30, 2022

(54) COPOLYESTERS PLASTICIZED WITH POLYMERIC PLASTICIZER

(71) Applicant: Eastman Chemical Company, Kingsport, TN (US)

(72) Inventors: Wayne Ken Shih, Kingsport, TN (US); Kimberley Carmenia Carico, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 27 days.

(21) Appl. No.: 15/866,922

(22) Filed: Jan. 10, 2018

(65) Prior Publication Data
US 2018/0298153 A1 Oct. 18, 2018

Related U.S. Application Data

(60) Provisional application No. 62/486,138, filed on Apr. 17, 2017.

(51) Int. Cl.
*C08J 5/18* (2006.01)
*C08J 3/18* (2006.01)
(Continued)

(52) U.S. Cl.
CPC .......... *C08J 5/18* (2013.01); *B29C 48/0018* (2019.02); *B29C 48/08* (2019.02); *B29C 48/919* (2019.02);
(Continued)

(58) Field of Classification Search
None
See application file for complete search history.

(56) References Cited

U.S. PATENT DOCUMENTS 3,772,405 A 11/1973 Hamb
4,122,057 A * 10/1978 Lamont .................. C08G 63/20
524/311
(Continued)

FOREIGN PATENT DOCUMENTS

EP 2 426 523 A2 3/2012
WO WO 2014 093041 A1 6/2014
(Continued)

OTHER PUBLICATIONS

Notification of Transmittal of the International Search Report and the Written Opinion of the International Searching Authority, or the Declaration received in International Application No. PCT/US2018/025826 dated Jul. 4, 2018.

*Primary Examiner* — Vivian Chen
(74) *Attorney, Agent, or Firm* — C. Stuart Everett; Tammye L. Taylor Polk

(57) ABSTRACT

Polyester-based films contain certain copolyesters (A) and polyester plasticizers (B). The copolyesters (A) may be selected from those in which the force required to stretch a film of the copolyester (A) by itself, from 2× to 5×, increases by less than 200%. The polyester plasticizers (B) have a weight-average molecular weight of 900 to 12,000 g/mol, and contain (i) a diol component comprising residues of diols having 2 to 8 carbon atoms, and (ii) a diacid component comprising residues of dicarboxylic acids having 4 to 12 carbon atoms. These polyester-based films are particularly useful for preparing ultra-thin LCD or OLED polarizers, because they can be stretched very thin with a high stretch ratio at lower temperatures.

21 Claims, 5 Drawing Sheets

(51) Int. Cl.
| | |
|---|---|
| *C08K 5/10* | (2006.01) |
| *B32B 27/30* | (2006.01) |
| *B32B 27/36* | (2006.01) |
| *B32B 7/12* | (2006.01) |
| *B32B 38/00* | (2006.01) |
| *B29C 48/88* | (2019.01) |
| *B29C 48/00* | (2019.01) |
| *B29C 48/08* | (2019.01) |
| *B29D 11/00* | (2006.01) |
| *C08L 67/02* | (2006.01) |
| *G02B 5/30* | (2006.01) |
| *C08J 7/04* | (2020.01) |
| *C08J 7/043* | (2020.01) |
| *B32B 27/16* | (2006.01) |
| *B32B 27/22* | (2006.01) |
| *B32B 27/18* | (2006.01) |
| *B32B 37/12* | (2006.01) |
| *C08K 5/00* | (2006.01) |
| *C08K 3/38* | (2006.01) |

(52) U.S. Cl.
CPC ......... *B29D 11/00644* (2013.01); *B32B 7/12* (2013.01); *B32B 27/306* (2013.01); *B32B 27/36* (2013.01); *B32B 38/0012* (2013.01); *C08J 3/18* (2013.01); *C08J 7/043* (2020.01); *C08J 7/0427* (2020.01); *C08K 5/10* (2013.01); *C08L 67/02* (2013.01); *G02B 5/3033* (2013.01); *B29D 11/00* (2013.01); *B29D 11/0073* (2013.01); *B32B 27/16* (2013.01); *B32B 27/18* (2013.01); *B32B 27/22* (2013.01); *B32B 37/12* (2013.01); *B32B 2038/0028* (2013.01); *B32B 2250/02* (2013.01); *B32B 2307/42* (2013.01); *B32B 2329/04* (2013.01); *B32B 2367/00* (2013.01); *C08J 2367/02* (2013.01); *C08J 2367/03* (2013.01); *C08J 2429/04* (2013.01); *C08J 2467/02* (2013.01); *C08J 2467/03* (2013.01); *C08K 3/38* (2013.01); *C08K 5/0016* (2013.01); *C08L 2203/16* (2013.01); *Y10T 428/31786* (2015.04); *Y10T 428/31797* (2015.04)

(56) References Cited

U.S. PATENT DOCUMENTS

| | | | | |
|---|---|---|---|---|
| 4,504,652 A * | 3/1985 | Widder | ............... | C08G 18/4238 |
| | | | | 525/437 |
| 5,053,482 A * | 10/1991 | Tietz | ................. | A61F 13/15252 |
| | | | | 264/103 |
| 5,362,803 A * | 11/1994 | LaFleur | .................. | C08L 29/04 |
| | | | | 525/205 |
| 5,378,759 A * | 1/1995 | Amici | ..................... | C08L 29/04 |
| | | | | 525/57 |
| 5,389,724 A * | 2/1995 | LaFleur | .................. | C08L 29/04 |
| | | | | 525/221 |
| 5,534,570 A * | 7/1996 | Shih | ............... | C08J 5/18 |
| | | | | 524/114 |
| 5,589,126 A | 12/1996 | Shih et al. | | |
| 5,753,782 A * | 5/1998 | Hammond | ......... | C08K 5/0016 |
| | | | | 424/444 |
| 5,817,721 A * | 10/1998 | Warzelhan | ............ | C08G 63/60 |
| | | | | 525/437 |
| 5,824,398 A | 10/1998 | Shih | | |
| 6,068,910 A | 5/2000 | Flynn et al. | | |
| 6,362,306 B1 | 3/2002 | Shelby et al. | | |
| 6,573,340 B1 * | 6/2003 | Khemani | ............... | B32B 27/06 |
| | | | | 428/480 |
| 6,787,245 B1 * | 9/2004 | Hayes | ................ | B32B 27/36 |
| | | | | 428/480 |
| 9,158,051 B2 | 10/2015 | Nam et al. | | |
| 9,227,222 B2 | 1/2016 | Izaki et al. | | |
| 10,138,338 B2 * | 11/2018 | Shih | ............... | C08J 5/18 |
| 10,329,393 B2 * | 6/2019 | Shih | ............... | C08J 5/18 |
| 10,329,395 B2 * | 6/2019 | Shih | ............... | C08J 5/18 |
| 10,421,264 B2 * | 9/2019 | Kitagawa | ............... | B32B 41/00 |
| 2003/0116880 A1 * | 6/2003 | Mueller | .................. | B32B 27/36 |
| | | | | 264/173.13 |
| 2003/0166748 A1 * | 9/2003 | Khemani | ............ | C08L 2666/02 |
| | | | | 524/47 |
| 2003/0166779 A1 * | 9/2003 | Khemani | ................ | C08L 67/03 |
| | | | | 525/178 |
| 2004/0127609 A1 * | 7/2004 | Strand | ...................... | C08K 5/10 |
| | | | | 524/115 |
| 2005/0004341 A1 * | 1/2005 | Culbert | .................... | B29B 9/16 |
| | | | | 528/308.3 |
| 2005/0113556 A1 * | 5/2005 | Strand | .................... | C08L 67/02 |
| | | | | 528/298 |
| 2006/0037406 A1 * | 2/2006 | Dharia | ..................... | G01N 3/04 |
| | | | | 73/818 |
| 2006/0094858 A1 * | 5/2006 | Turner | ................ | C08G 63/199 |
| | | | | 528/272 |
| 2006/0235167 A1 * | 10/2006 | Hale | ....................... | C08L 67/02 |
| | | | | 525/420 |
| 2006/0287493 A1 * | 12/2006 | Crawford | ............ | C09D 167/02 |
| | | | | 528/302 |
| 2007/0010650 A1 * | 1/2007 | Crawford | ............... | B65D 25/00 |
| | | | | 528/302 |
| 2007/0087132 A1 * | 4/2007 | Greener | ............... | G02B 5/3083 |
| | | | | 428/1.1 |
| 2007/0100125 A1 * | 5/2007 | Crawford | ............ | C08G 63/199 |
| | | | | 528/302 |
| 2007/0224377 A1 * | 9/2007 | Leimbacher | ........... | C08L 67/02 |
| | | | | 428/36.92 |
| 2008/0058466 A1 * | 3/2008 | Joshi | ....................... | C08G 63/20 |
| | | | | 524/567 |
| 2008/0293857 A1 * | 11/2008 | Crawford | .............. | C08G 63/82 |
| | | | | 524/147 |
| 2009/0130276 A1 * | 5/2009 | Voisin | .................... | B32B 27/08 |
| | | | | 426/415 |
| 2009/0246496 A1 * | 10/2009 | Nielsen | ...................... | C08J 5/04 |
| | | | | 428/220 |
| 2010/0068355 A1 * | 3/2010 | Berry | ........................ | B32B 1/02 |
| | | | | 426/125 |
| 2010/0087574 A1 * | 4/2010 | Crawford | ............ | C08G 63/199 |
| | | | | 524/141 |
| 2010/0221391 A1 * | 9/2010 | Deng | ..................... | B32B 27/36 |
| | | | | 426/114 |
| 2012/0055607 A1 * | 3/2012 | Kitagawa | ................ | B32B 41/00 |
| | | | | 156/64 |
| 2012/0055608 A1 * | 3/2012 | Kitagawa | ................ | B26D 1/151 |
| | | | | 156/64 |
| 2012/0058321 A1 * | 3/2012 | Goto | ....................... | B29C 55/026 |
| | | | | 428/213 |
| 2012/0184669 A1 * | 7/2012 | Hale | ........................ | C08K 3/015 |
| | | | | 524/539 |
| 2012/0281279 A1 * | 11/2012 | Goto | ....................... | B29C 55/023 |
| | | | | 359/487.02 |
| 2013/0128357 A1 * | 5/2013 | Izaki | ..................... | B29C 55/026 |
| | | | | 359/487.02 |
| 2013/0236612 A1 * | 9/2013 | Deng | ....................... | B32B 27/08 |
| | | | | 426/129 |
| 2013/0281560 A1 * | 10/2013 | Bastioli | ...................... | C08J 5/18 |
| | | | | 521/138 |
| 2013/0303692 A1 * | 11/2013 | Crawford | ................ | C08K 5/005 |
| | | | | 524/605 |
| 2013/0329289 A1 * | 12/2013 | Haida | .................. | G02B 5/3083 |
| | | | | 359/483.01 |
| 2014/0162042 A1 * | 6/2014 | Shih | ............................ | C08J 5/18 |
| | | | | 428/220 |
| 2015/0018468 A1 * | 1/2015 | Sawada | .................... | C08L 67/02 |
| | | | | 524/221 |
| 2015/0132561 A1 * | 5/2015 | Goto | ..................... | G02B 5/3033 |
| | | | | 428/220 |
| 2015/0219797 A1 * | 8/2015 | Goto | ........................ | G02B 1/111 |
| | | | | 359/487.02 |

(56) References Cited

U.S. PATENT DOCUMENTS

| | | |
|---|---|---|
| 2016/0084990 A1 | 3/2016 | Nam et al. |
| 2016/0085005 A1* | 3/2016 | Nam ................. G02B 5/305 |
| 2016/0122471 A1* | 5/2016 | Bae ..................... C08J 3/18 |
| | | 524/310 |
| 2016/0200862 A1* | 7/2016 | Bastioli ............ C08G 63/181 |
| | | 524/47 |
| 2016/0370502 A1* | 12/2016 | Haida .................. G02B 1/04 |
| 2017/0066901 A1* | 3/2017 | Yang ................. C08L 69/00 |
| 2017/0096536 A1* | 4/2017 | Shih .................... C08J 5/18 |
| 2017/0260388 A1* | 9/2017 | Lehenmeier ........... C08L 67/02 |
| 2018/0037696 A1* | 2/2018 | Mehta ................ C08G 63/20 |

FOREIGN PATENT DOCUMENTS

| | | | |
|---|---|---|---|
| WO | WO 2017/010178 A | * | 1/2017 |
| WO | WO 2017 010178 A1 | | 1/2017 |

* cited by examiner

COPOLYESTERS PLASTICIZED WITH POLYMERIC PLASTICIZER

CROSS-REFERENCE TO RELATED APPLICATION

This application claims the benefit of Provisional Application No. 62/486,138 filed on Apr. 17, 2017 under 35 U.S.C. § 119(e)(1); the entire content of the provisional application is hereby incorporated by reference.

FIELD OF THE INVENTION

This disclosure relates to films, which comprise copolyesters with polymeric plasticizers and which are particularly useful for producing ultra-thin LCD and OLED polarizer films, and methods of manufacturing the same.

BACKGROUND OF THE INVENTION

Ultra-thin, high-performance polarizers are in demand for ever-thinning electronic devices, such as smartphones, tablets, PCs, and TVs.

Optical films with a polarizing function (polarizers) are used in a variety of optical applications. For example, they are used in liquid crystal displays (LCDs) and organic light emitting diode (OLED) applications and devices. In general, polarizers function to convert natural light into polarized light. Such polarizing function is often achieved using highly oriented polyvinyl alcohol (PVA) films dyed with iodine and/or iodide compounds. For LCDs, the polarizers are often dyed with iodine/iodide, as the polarizing material. Polarizer films are often prepared from transparent and highly uniform PVA films that are stained with dyes first and then uniaxially stretched to orient the polymer molecules to produce a dichroic film in a hot-air dry process. The PVA polarizers stretched in a dry process, however, tend to be thick and not very uniform in thickness.

Another method of producing thin polarizer films includes casting or laminating a PVA layer on a thermoplastic substrate (a carrier film), such as polyethylene terephthalate (PET) to form a laminate, dyeing the PVA layer of the laminate with iodine/iodide, stretching the laminate in a wet process, and separating the PVA layer from the carrier film to obtain a polarizer. Generally, in a wet process, thin PVA polarizer films are produced by passing the laminate through a roll-type transporting apparatus and subjecting it to a wet stretching step using a solution at a temperature of about 65° C. or higher. However, the PVA film may dissolve in the solution at high temperatures, or the PET carrier film can crystallize and break if a high stretching ratio is attempted. Therefore, it has been difficult to manufacture high performance, ultra-thin polarizers when a high glass transition temperature (Tg) PET carrier film is used.

Currently, PET or APET (amorphous polyethylene terephthalate) is often used as the carrier film for producing thin PVA polarizers. PET or APET is frequently used in wet stretching processes. Generally, APET is not used in the dry stretching process due to its high Tg of about 80° C. Likewise, APET is not ideal for ultra-thin PVA production in the wet stretching process due to its inherent strain-induced crystallization, which limits its elongation before break.

Accordingly, there is a need to solve both issues experienced when using PET or APET as the carrier film to produce thin polarizer films in dry and wet processes. There is also a need for a carrier film and process for producing ultra-thin polarizers with improved strength and stability for ease of processing.

The present disclosure addresses these needs, as well as others, which will become apparent from the following description and the appended claims.

SUMMARY OF THE INVENTION

Carrier films of the present disclosure, which generally comprise copolyesters and polyester plasticizers, can unexpectedly produce ultra-thin polarizer films.

In one aspect, the present disclosure provides a polyester-based film made from a blend comprising (A) a copolyester and (B) a polyester plasticizer having a weight-average molecular weight ($M_w$) of 900 to 12,000 g/mol. The film has been stretched underwater. The copolyester (A) comprises (a) a diacid component comprising at least 50 mole percent of residues of terephthalic acid, naphthalenedicarboxylic acid, 1,4-cyclohexanedicarboxylic acid, isophthalic acid, or mixtures thereof; and (b) a diol component comprising at least 80 mole percent of residues of a diol containing 2 to 10 carbon atoms, wherein the diacid component is based on 100 mole percent of total diacid residues in the copolyester, and the diol component is based on 100 mole percent of total diol residues in the copolyester. The polyester plasticizer (B) comprises (a) a diol component comprising residues of a diol having 2 to 8 carbon atoms and (b) a diacid component comprising residues of a dicarboxylic acid having 4 to 12 carbon atoms. Desirably, the force required to stretch a film of the copolyester (A) by itself from 2× to 5× increases by less than 200% when the copolyester (A) film is stretched in the machine direction, in air, at 10 to 15° C. above the glass transition temperature of the copolyester (A).

In another aspect, the present disclosure provides a laminate comprising (I) a polyvinyl alcohol-based film and (II) a polyester-based film.

In yet another aspect, the present disclosure provides a method of producing an ultra-thin film polarizer. The method comprises (i) forming a polyvinyl alcohol-based film (I) on a substrate comprising a polyester-based film (II) to obtain a laminate; (ii) contacting the laminate with a dyeing liquid to dye the polyvinyl alcohol-based film (I); (iii) stretching the laminate so that the polyvinyl alcohol-based film (I) has a thickness of 10 μm or less after stretching; and (iv) separating the polyvinyl alcohol-based film (I) from the substrate to obtain an ultra-thin film polarizer.

DETAILED DESCRIPTION OF THE INVENTION

Figure 1:
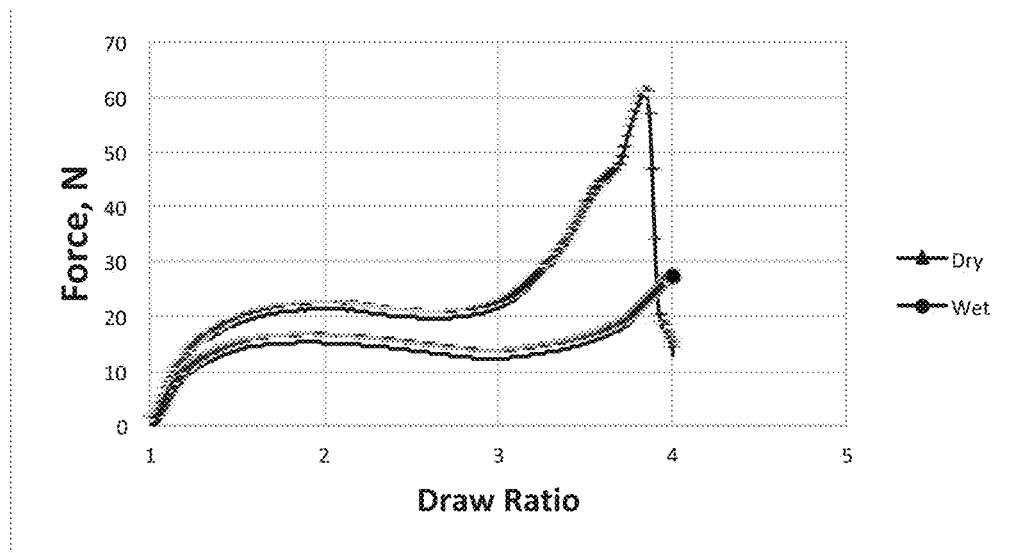
FIG. 1 illustrates the stretching characteristics of dry APET and wet APET films.

The present disclosure may be understood more readily by reference to the following detailed description of certain embodiments consistent with the present teachings and the working examples.

This disclosure solves the issues experienced when using PET or APET as the carrier film to produce thin/ultra-thin polarizer films in dry and wet processes. It has been surprisingly discovered that ultra-thin polarizers can be produced using carrier films that comprise certain copolyesters (COPE) and, optionally, polyester plasticizers (PZ) as described herein. Ultra-thin polarizers can be manufactured by forming a thin layer of PVA on a low Tg carrier film according to the present disclosure. The resulting PVA/carrier laminate can be stretched at temperatures around 65° C. or lower. The carrier film undergoes minimal, if any, crystallization and does not break during stretching, even with a much higher draw ratio, so that an ultra-thin polarizer with enhanced polarization efficiency can be produced.

Copolyesters (COPE or COPEs) useful in making carrier films of the present disclosure exhibit minimal, if any, strain-induced crystallization (SIC) during the stretching process. Therefore, the COPE containing carrier films can be stretched or elongated to a higher draw ratio using a lower stretching force when compared to carrier films made from crystallizable APET. Thus, much thinner PVA films can be produced using the COPE carrier films than with carrier films made from crystallizable APET.

Also, the glass transition temperature (Tg) of the COPE according to the present disclosure can be at least 10° C. lower than the Tg of APET. As such, the carrier films of the present disclosure can be stretched at lower temperatures, even without the addition of a plasticizer. Incorporating plasticizers into the COPE carrier films can further reduce the stretching temperatures in a dry or a wet process.

The COPEs of the present disclosure have good moisture uptake so that their Tg's can be reduced significantly in a wet stretching process, especially in conjunction with a polyester plasticizer. The combined effect of water and the plasticizer on the Tg of the copolyester permits films made from the COPE to be stretched at a low temperature to a high draw ratio using a low drawing force in the wet process. Such films, as carrier layers, are particularly useful for making ultra-thin, uniform, and high performance PVA polarizer films.

Unless the context clearly suggests otherwise, the terms "polyester" and "copolyester" are used interchangeably herein. The term "polyester" is intended to include "copolyesters" and is understood to mean a synthetic polymer prepared by the polycondensation of one or more difunctional carboxylic acids (or diacids) with one or more difunctional hydroxyl compounds (or diols). In various embodiments, the difunctional carboxylic acid is a dicarboxylic acid and the difunctional hydroxyl compound is a dihydric alcohol, such as, for example, glycols and diols.

The term "residue" means any organic structure incorporated into a polymer through a polycondensation reaction involving the corresponding monomer. The term "repeating unit" means an organic structure having a dicarboxylic acid residue (or diacid component) and a diol residue (or diol component) bonded through a carbonyloxy group. Thus, the dicarboxylic acid residues may be derived from a dicarboxylic acid monomer or its associated acid halides, esters, salts, anhydrides, or mixtures thereof.

The term "base film" means an extruded, unstretched film.

Copolyesters (COPE)

The COPEs useful in the present disclosure tend to exhibit minimal strain-induced crystallization (sometimes referred to as stress-induced crystallization) during stretching. This minimal strain-induced crystallization may be characterized in one or more ways.

For example, a film of the COPE may have no more than 20%, no more than 15%, no more than 10%, no more than 5%, no more than 3%, or no more than 1% crystallinity when stretched up to 5× in the machine direction at a temperature of Tg+10° C. and at a strain rate of 100%, where Tg is the glass transition temperature of the COPE. In various embodiments, a film of the COPE has no more than 15% crystallinity when stretched at these conditions. In various other embodiments, a film of the COPE has no more than 10% crystallinity when stretched at these conditions. In yet various other embodiments, a film of the COPE has no more than 5% crystallinity when stretched at these conditions. Polymer crystallinity may be measured using methods known in the art. The feature(s) mentioned in this paragraph may be applied to any embodiment and any combination of embodiments in this disclosure.

Strain-induced crystallization (SIC) may be gauged indirectly by monitoring the force required to perform the stretching. For example, if the force required to dry stretch a 500 μm-thick film from 2× to 5× in the machine direction at a temperature of Tg+10° C. or Tg+15° C. increases by more than 35 N, or if the film ruptures, then the polymer exhibits significant, rather than minimal SIC during stretching. Thus, in various embodiments of the present disclosure, the force required to dry stretch a 200 μm-thick film of the COPE from 2× to 5× in the machine direction at a temperature of Tg+10° C. increases by no more than 30 N. In various other embodiments, the force required increases by no more than 20 N. In yet various other embodiments, the force required increases by no more than 10 N. The feature(s) mentioned in this paragraph may be applied to any embodiment and any combination of embodiments in this disclosure.

Similarly, the COPE exhibits minimal SIC if the force required to stretch a film of the COPE alone from 2× to 5× increases by less than 200% when the COPE film is stretched in the machine direction, in air, at 10 to 15° C. above the Tg of the COPE. In various embodiments, the force increases by 150% or less. In various other embodiments, the force increases by 100% or less. In yet various other embodiments, the force increases by 50% or less. The feature(s) mentioned in this paragraph may be applied to any embodiment and any combination of embodiments in this disclosure.

Copolyesters that exhibit minimal SIC during stretching tend to be at least substantially amorphous before stretching. For example, the COPE may have a degree of crystallinity of 20% or less, before stretching. The COPE may have a degree of crystallinity of 15% or less, before stretching. The COPE may have a degree of crystallinity of 10% or less, before stretching. The COPE may have a degree of crystallinity of 5% or less, before stretching. The COPE may have a degree of crystallinity of 3% or less, before stretching. Or the COPE may have a degree of crystallinity of 1% or less, before stretching. Preferably, the COPE will also be at least substantially amorphous after stretching. That is, preferably, the COPE will only minimally crystallize, if at all, in stretching, unlike APET. The feature(s) mentioned in this paragraph may be applied to any embodiment and any combination of embodiments in this disclosure.

The copolyesters suitable for use in the present disclosure contain repeat units from a dicarboxylic acid and a diol, based on 100 mole percent of dicarboxylic acid residues and 100 mole percent of diol residues, respectively.

In various embodiments, the diacid component contains at least 50 mole percent of the residues of an aromatic dicarboxylic acid having 8 to 14 carbon atoms. The copolyester may optionally be modified with up to 50 mole percent, based on 100 mole percent of dicarboxylic acid residues, of the residues of one or more different dicarboxylic acids other than an aromatic dicarboxylic acid, such as saturated aliphatic dicarboxylic acids having 4 to 12 carbon atoms and cycloaliphatic dicarboxylic acids having 8 to 12 carbon atoms. Specific examples of dicarboxylic acids include terephthalic acid, phthalic acid, isophthalic acid, naphthalene dicarboxylic acid, 1,4-cyclohexane dicarboxylic acid, cyclohexane diacetic acid, diphenyl-4,4'-dicarboxylic acid, succinic acid, glutaric acid, adipic acid, azelaic acid, sebacic acid, and the like. The copolyester may be prepared from one or more of the above dicarboxylic acids. It should be understood that use of the corresponding acid anhydrides, esters, and acid chlorides of these acids is included in the term "dicarboxylic acid."

In various embodiments, the diol component contains at least 80 mole percent of the residues of a diol containing 2 to 10 carbon atoms. The diol component may optionally be modified with up to 20 mole percent, based on 100 mole percent of diol residues, of the residues of one or more other diols. Specific examples of diols include ethylene glycol, diethylene glycol, triethylene glycol, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. The copolyester may be prepared from one or more of the above diols.

The copolyester may also contain small amounts (e.g., <5 mole %) of the residues of trifunctional or tetrafunctional co-monomers, such as trimellitic anhydride, trimethylolpropane, pyromellitic dianhydride, pentaerythritol, and other polyester forming polyacids or polyols generally known in the art.

In various embodiments, the copolyester comprises (i) a diacid component comprising at least 50 mole percent of residues of terephthalic acid, naphthalenedicarboxylic acid, 1,4-cyclohexanedicarboxylic acid, isophthalic acid, or mixtures thereof; and (ii) a diol component comprising at least 80 mole percent of residues of a diol containing 2 to 10 carbon atoms.

In various embodiments, the diacid component of the copolyester comprises at least about 80 mole percent of the residues of terephthalic acid, naphthalenedicarboxylic acid, 1,4-cyclohexanedicarboxylic acid, isophthalic acid, or mixtures thereof.

In various embodiments, the diol component of the copolyester comprises the residues of ethylene glycol, 1,4-cyclohexanedimethanol, diethylene glycol, neopentyl glycol, 2,2,4,4-tetramethyl-1,3-cyclobutanediol, or mixtures thereof.

In various embodiments, the copolyester comprises (i) a diacid component comprising at least 80 mole percent of terephthalic acid residues, and (ii) a diol component comprising at least 80 mole percent of the residues of ethylene glycol and 1,4-cyclohexanedimethanol.

In various embodiments, the copolyester comprises (i) a diacid component comprising at least 80 mole percent of terephthalic acid residues, and (ii) a diol component comprising 17 to 70 mole percent of the residues of 1,4-cyclohexanedimethanol and 30 to 83 mole percent of the residues of ethylene glycol.

In various embodiments, the copolyester comprises (i) a diacid component comprising at least 80 mole percent of terephthalic acid residues, and (ii) a diol component comprising 17 to 35 mole percent of the residues of 1,4-cyclohexanedimethanol and 65 to 83 mole percent of the residues of ethylene glycol.

In various embodiments, the copolyester comprises (i) a diacid component comprising at least 80 mole percent of terephthalic acid residues, and (ii) a diol component comprising at least 80 mole percent of the residues of ethylene glycol, 1,4-cyclohexanedimethanol, and diethylene glycol.

In various embodiments, the copolyester comprises (i) a diacid component comprising at least 80 mole percent of terephthalic acid residues, and (ii) a diol component comprising at least 80 mole percent of residues of ethylene glycol and neopentyl glycol.

In various embodiments, the copolyester comprises (i) a diacid component comprising at least 80 mole percent of terephthalic acid residues, and (ii) a diol component comprising at least 80 mole percent of the residues of 1,4-cyclohexanedimethanol and 2,2,4,4-tetramethyl-1,3-cycobutanediol.

The various copolyesters, and the diacid and diol components, mentioned above may be applied to any embodiment and any combination of embodiments in this disclosure.

Copolyesters useful in the present disclosure can have an inherent viscosity of 0.5 to 1.2 dL/g as measured at 25° C. using 0.50 grams of polymer per 100 mL of a solvent consisting of 60% by weight of phenol and 40% by weight of tetrachloroethane. For example, in various embodiments, the copolyester has an inherent viscosity of 0.6 to 0.9 dL/g. The feature(s) mentioned in this paragraph may be applied to any embodiment and any combination of embodiments in this disclosure.

Copolyesters useful in the present disclosure can have a glass transition temperature (Tg) in the range of 30° C. to 120° C. For example, in various embodiments, the copolyesters can have a Tg in the range of 40° C. to 90° C., 40° C. to 80° C., 40° C. to 70° C., 40° C. to 60° C., 50° C. to 70° C., 50° C. to 65° C., or 50° C. to 60° C. In various other embodiments, the copolyesters can have a Tg of 70° C. or less, of 65° C. or less, of 60° C. or less, of 55° C. or less, or of 50° C. or less. In yet various other embodiments, the copolyesters can have a Tg of at least 30° C., at least 35° C., at least 40° C., at least 45° C., or at least 50° C., and in each case, up to 55° C., up to 60° C., up to 65° C., or up to 70° C. The feature(s) mentioned in this paragraph, including each temperature range, may be applied to any embodiment and any combination of embodiments in this disclosure.

Alternatively, or in combination any of the feature(s) mentioned above, the copolyesters (COPE) suitable for use in the present disclosure may be defined by their minimum crystallization half-times. For example, in various embodiments, the COPE can have a minimum crystallization half-time of at least 5 minutes, at least 7 minutes, at least 8.6 minutes, at least 10 minutes, at least 12 minutes, at least 30 minutes, or infinity. In various other embodiments, the COPE has a minimum crystallization half-time of at least 5 minutes. In yet various other embodiments, the COPE has a minimum crystallization half-time of at least 8.6 minutes. To be clear, the feature(s) mentioned in this paragraph may be applied to any embodiment and any combination of embodiments in this disclosure.

Crystallization half-times can be measured using a differential scanning calorimeter according to the following procedure. A sample of 10.0 mg of the COPE is sealed in an aluminum pan and heated at a rate of 320° C./min to 290° C. and held for 2 minutes in a helium atmosphere. The sample is then cooled immediately at a rate of 320° C./min to an isothermal crystallization temperature ranging from 140° C. to 200° C. with a 10° C. interval. The crystallization half-time at each temperature is then determined as the time needed to reach the peak on the exothermic curve. The minimum crystallization half-time is the temperature at which the crystallization rate is the fastest (i.e., where the crystallization half-time is the shortest).

Blends of the COPE with other polymers (including other polyesters and copolyesters) may be used. In various embodiments, the blends have a minimum crystallization half-time of, for example, at least 5 minutes or at least 8.6 minutes and/or a degree of crystallinity of, for example, 20% or less, or 15% or less. In various embodiments, blends of PET and/or amorphous PET with the COPE can be used. In various other embodiments, any miscible blend may be used as long as the film remains optically transparent.

The term "transparent" is defined herein as the absence of (or the presence of very low levels of) cloudiness, haziness, or muddiness that can be seen by the naked eye.

The term "miscible" refers to blends of two or more polymers that are homogenous on a molecular level and behave as a single-phase mixture, exhibiting only one glass transition temperature.

The copolyester may be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid-state polymerization methods. Suitable methods include the steps of reacting one or more dicarboxylic acids with one or more glycols at a temperature of 100° C. to 315° C. at a pressure of 0.1 to 760 mm Hg for a time sufficient to form a polyester. See, e.g., U.S. Pat. No. 3,772,405 for methods of producing polyesters; the disclosure of such methods is incorporated herein by reference.

The copolyesters useful in the present disclosure may be also obtained commercially from Eastman Chemical Company.

The COPE, with or without a polyester plasticizer (as described in more detail below), can be formed into a film using conventional film forming techniques. For example, the COPE may be formed into a single-layer or a multi-layer film using an extrusion or co-extrusion technique, respectively. Films made from the COPE can be used as carrier films for making PVA-based polarizers.

Polyester Plasticizers

In one aspect, the present disclosure provides a polyester-based film comprising a COPE as described herein and a miscible polyester plasticizer. The plasticizer can increase the COPE's flexibility, elongation, and ease of processing. The physical effects of the plasticizer can be measured by melt viscosity, elastic modulus, and glass transition temperature.

The polyester plasticizers (PZ) useful in the present disclosure are desirably miscible with the copolyester so that the resulting film remains optically transparent in either a dry or wet stretching process.

The polyester plasticizers useful in the present disclosure typically have a weight-average molecular weight ($M_w$) of 900 to 12,000 g/mol. In various embodiments, the plasticizer has a $M_w$ of 900 to 6,000 g/mol. In various embodiments, the plasticizer has a $M_w$ of 900 to 5,000 g/mol. In various embodiments, the plasticizer has a $M_w$ of 900 to 4,000 g/mol. In various embodiments, the plasticizer has a $M_w$ of 1,000 to 12,000 g/mol. In various embodiments, the plasticizer has a $M_w$ of 1,000 to 6,000 g/mol. In various embodiments, the plasticizer has a $M_w$ of 1,000 to 5,000 g/mol. In various embodiments, the plasticizer has a $M_w$ of 1,000 to 4,000 g/mol. In various embodiments, the plasticizer has a $M_w$ of 2,000 to 12,000 g/mol. In various embodiments, the plasticizer has a $M_w$ of 2,000 to 6,000 g/mol. In various embodiments, the plasticizer has a $M_w$ of 2,000 to 5,000 g/mol. In various embodiments, the plasticizer has a $M_w$ of 2,000 to 4,000 g/mol. The feature(s) mentioned in this paragraph may be applied to any embodiment and any combination of embodiments in this disclosure.

The polyester plasticizers typically comprise (i) a diol component comprising the residues of a diol having 2 to 8 carbon atoms, and (ii) a diacid component comprising the residues of a dicarboxylic acid having 4 to 12 carbon atoms.

Suitable diols containing from 2 to 8 carbons atoms include ethylene glycol, 1,2- or 1,3-propanediol; 1,2- or 1,3- or 1,4-butanediol; diethylene glycol; and dipropylene glycol.

Suitable dicarboxylic acids may be represented by the formula HO(O)CRC(O)OH where R is selected from the group consisting of linear and branched alkylene radicals containing from 2 to 10 carbon atoms and phenylene. Specific examples of such dicarboxylic acids include succinic acid, glutaric aid, adipic acid, azelaic acid, sebacic acid, isophthalic acid, orthophthalic acid, terephthalic acid, benzene-1,2-dicarboxylic acid, benzene-1,4-dicarboxylic acid, and mixtures thereof. Anhydrides of these diacids can readily be used depending on cost and availability.

In various embodiments, the polyester plasticizer comprises residues of phthalic acid, adipic acid, or mixtures thereof; and residues of 1,2-propanediol, 1,3-butanediol, 1,4-butanediol, or mixtures thereof.

In various embodiments, the polyester plasticizer comprises residues of phthalic acid; and residues of 1,2-propanediol and 1,4-butanediol.

In various embodiments, the polyester plasticizer comprises residues of phthalic acid and adipic acid; and residues of 1,2-propanediol and 1,3-butanediol.

In various embodiments, the polyester plasticizer comprises residues of adipic acid; and residues of 1,2-propanediol and 1,4-butanediol.

In various embodiments, the polyester plasticizer comprises residues of adipic acid; and residues of 1,3-butanediol.

In various embodiments, the polyester plasticizer is free of polylactic acid segments with a number average molecular weight of 1,500 or more. In various other embodiments, the polyester plasticizer is free of polylactic acid segments.

The various polyester plasticizers, and their diacid and diol components, mentioned above may be applied to any embodiment and any combination of embodiments in this disclosure.

The plasticizers according to the present disclosure can be made by reacting one or more diols or glycols with one or more cyclic or aliphatic organic acids containing two or more acid functionalities until the desired molecular weight is obtained as determined by viscosity measurements or any other generally acceptable method. The molecular weight of the polymer can be controlled by capping the unreacted acid or alcohol functionality at the end of the polyester chains using either mono-functional alcohols or monobasic carboxylic acids until the desired hydroxyl and/or acid number of the product is reached. The hydroxyl numbers of the polyester plasticizers can range from 0 to 40 mg KOH/g, and the acid numbers or acid values can range from 0 to 50 mg KOH/g; for example, from 1 to 5 mg KOH/g.

The capping agents can be chosen from any number of readily available alcohols or acids. Suitable capping alcohols can contain 2 to 18 carbon atoms and can be linear or branched. Suitable monobasic acid capping agents include those containing 2 to 22 carbons and can be any number of fatty acids containing $C_8$ to $C_{22}$ carbons or other common acids such as acetic acid or 2-ethyl hexanoic acid. Anhydrides, such as acetic anhydride, can be used in place of the acid.

Examples of polyester plasticizers suitable for use in the present disclosure include those commercially available under the name Admex™ from Eastman Chemical Company.

Polyester-Based Films/Carrier Films

As noted above, one aspect of the present disclosure relates to polyester-based films made from a copolyester (A) as described herein.

Another aspect of the present disclosure relates to polyester-based films made from blends comprising (A) a copolyester as described herein and (B) a polyester plasticizer as described herein.

For example, the films according to the present disclosure may comprise:

(A) a copolyester where the force required to stretch a film of the copolyester (A) alone from 2× to 5× increases by less than 200% when the copolyester (A) film is stretched in the machine direction, in air, at 10 to 15° C. above the glass transition temperature of the copolyester (A); and (B) a polyester plasticizer having a weight-average molecular weight ($M_w$) of 900 to 12,000 g/mol. In various embodiments, the force required to stretch a film of the copolyester (A) by itself from 2× to 5× increases by 150% or less. In various other embodiments, the force increases by 100% or less. In yet various other embodiments, the force increases by 50% or less.

As noted above, the copolyester (A) may comprise, for example:

(a) a diacid component comprising at least 50 mole percent of residues of terephthalic acid, naphthalenedicarboxylic acid, 1,4-cyclohexanedicarboxylic acid, isophthalic acid, or mixtures thereof; and (b) a diol component comprising at least 80 mole percent of residues of a diol containing 2 to 10 carbon atoms, wherein the diacid component is based on 100 mole percent of total diacid residues in the copolyester, and the diol component is based on 100 mole percent of total diol residues in the copolyester.

And as noted above, the polyester plasticizer (B) may comprise, for example:

(a) a diol component comprising residues of a diol having 2 to 8 carbon atoms; and (b) a diacid component comprising residues of a dicarboxylic acid having 4 to 12 carbon atoms.

The films according to the present disclosure may be prepared by any method known in the industry. For example, the polyester plasticizer can be mixed with the copolyester by any suitable melt blending process, such as batch mixing, single-screw, or twin-screw extrusion. In various embodiments, the plasticizer is injected into a melt of the copolyester using a liquid or solid pumping system. In various other embodiments, the copolyester/plasticizer mixture can be prepared by adding the plasticizer to the copolyester after polymerization of the copolyester is essentially complete. After completing the melt compounding and upon exiting the extruder, the extrudate may be shaped into a film. Alternatively, the extrudate may be withdrawn in strand form and cut into pellets, or may be formed directly into pellets.

The pellets may be used as a concentrate, which can be mixed with additional quantities of the copolyester before film forming. Methods for mixing the concentrate pellets with the copolyester pellets include feeding the concentrate pellets with an additive feeder and mechanically mixing the copolyester and concentrate pellets. The copolyester/concentrate blends may then be dried, melt blended, and extruded into a film. This film is typically visually clear before and after stretching.

Alternatively, the copolyester/concentrate blends may be formed into a film by calendering as disclosed in, e.g., U.S. Pat. No. 6,068,910. In addition, the copolyester/concentrate blends may be formed into the film by any known calendering methods.

In various embodiments of the present disclosure, the blends from which the films are prepared can contain from 0.01 to 10 weight percent of the polyester plasticizer, based on the total weight of the blend. In various other embodiments, the blends can contain from at least 0.1, at least 1, at least 2, at least 3, at least 4, or at least 5; and in case, up to 10, up to 9, up to 8, up to 7, up to 6, or up to 5 weight percent of the polyester plasticizer, based on the total weight of the blend. For example, the blend may contain from 3 to 8% by weight of the polyester plasticizer, based on the total weight of the blend. The balance of these blends may be the COPE, or the COPE and any additives. The feature(s) mentioned in this paragraph may be applied to any embodiment and any combination of embodiments in this disclosure.

In various embodiments, the final blends/films can contain from 90 to 99.99 weight percent of the copolyester, based on the total weight of the blend/film. In various other embodiments, the final blends/films can contain from 95 to 99.9 weight percent of the copolyester, based on the total weight of the blend/film. The feature(s) mentioned in this paragraph may be applied to any embodiment and any combination of embodiments in this disclosure.

The blends/films of the present disclosure may further comprise one or more additives in amounts that do not adversely affect the resulting properties of the films. Examples of additives include antioxidants, melt strength enhancers, chain extenders, flame retardants, fillers, acid scavengers, dyes, colorants, pigments, anti-blocking agents, flow enhancers, impact modifiers, antistatic agents, processing aids, mold-release additives, slip agents, stabilizers, waxes, UV absorbers, optical brighteners, lubricants, pinning additives, and the like. Representative examples of fillers include calcium carbonate, talc, clay, mica, zeolites, wollastonite, kaolin, diatomaceous earth, $TiO_2$, $NH_4Cl$, silica, calcium oxide, sodium sulfate, and calcium phosphate. The feature(s) mentioned in this paragraph may be applied to any embodiment and any combination of embodiments in this disclosure.

In various embodiments, the films of the present disclosure can have a thickness of 25 to 500 µm, or from 100 to 250 µm, before being stretched. The feature(s) mentioned in this paragraph may be applied to any embodiment and any combination of embodiments in this disclosure.

In various embodiments, the polyester-based films of the present disclosure are advantageously stretched underwater (also known as in-water stretching or a wet stretching process). The feature(s) mentioned in this paragraph may be applied to any embodiment and any combination of embodiments in this disclosure.

A wet stretching process can allow the films to be stretched at higher stretch ratios and/or lower temperatures without rupturing or breaking. For example, the polyester-based films of the present disclosure may be stretched at least 5×, at least 6×, or at least 7× their original length in the machine direction at a temperature of 60° C. or below without rupturing. The feature(s) mentioned in this paragraph may be applied to any embodiment and any combination of embodiments in this disclosure.

Any appropriate method may be used to stretch the polyester-based films. For example, the roll stretching method, the long-gap stretching method, or the tenter-stretching method may be used. The stretching may be performed in one or more stages.

The underwater stretching is preferably performed by immersing the polyester-based film in an aqueous solution comprising boric acid and optionally a dye. The feature(s) mentioned in this paragraph may be applied to any embodiment and any combination of embodiments in this disclosure.

The boric acid aqueous solution may be obtained by dissolving boric acid and/or a borate or by dissolving a boron compound that generates boric acid, such as borax, in water. The concentration of the boric acid can be in the range of 1 to 10 parts per 100 parts of water by weight. The feature(s) mentioned in this paragraph may be applied to any embodiment and any combination of embodiments in this disclosure.

In various embodiments, the polyester-based film is stretched at 5° C. to 30° C. above the film's glass transition temperature (Tg). In various other embodiments, the film is stretched at 10° C. to 20° C. above its Tg. In various other embodiments, the film is stretched at 10° C. to 15° C. above its Tg. In various other embodiments, the film is stretched at 10° C. above its Tg. The feature(s) mentioned in this paragraph may be applied to any embodiment and any combination of embodiments in this disclosure.

In various embodiments, the stretching temperature is in the range of 40° C. to 85° C. In various other embodiments, the stretching temperature is in the range of 50° C. to 70° C. The feature(s) mentioned in this paragraph may be applied to any embodiment and any combination of embodiments in this disclosure.

In various embodiments, the polyester-based film is immersed in the stretching solution bath in the range of 5 seconds to 5 minutes. The feature(s) mentioned in this paragraph may be applied to any embodiment and any combination of embodiments in this disclosure.

The stretching direction of the polyester-based film is not restricted in any way. For example, the film may be stretched in either the machine direction or in the transverse direction or both. In various embodiments, the polyester-based film is uniaxially stretched in the machine direction. The film can be stretched from 2 to 7 times the original film's measurements. The feature(s) mentioned in this paragraph may be applied to any embodiment and any combination of embodiments in this disclosure.

In various embodiments, the polyester-based film, after underwater stretching, has greater than 0.2 wt % of water absorption, based on the total weight of the film. In various other embodiments, the polyester-based film comprises from 0.1 to 0.3%, from greater than 0.1 to 0.3%, from 1.5 to 0.3%, from greater than 1.5 to 0.3%, from 0.2 to 0.3%, or from greater than 0.2 to 0.3% by weight of moisture, based on the total weight of the polyester-based film. The feature(s) mentioned in this paragraph may be applied to any embodiment and any combination of embodiments in this disclosure.

The polyester-based films of the present disclosure are sometimes referred to as carrier films, particularly when they are used as a substrate for another film, such as PVA. The carrier films of the present disclosure are particularly useful as substrates in laminates for producing ultra-thin film polarizers.

The carrier films of the present disclosure can be stretched at lower temperatures, compared to films made from APET. The initial Tg of the COPE in the present disclosure is relatively low. In various embodiments, for example, the Tg of the COPE is from 50 to 70° C. In various other embodiments, the Tg of the COPE is less than 70° C., or less than 60° C. But the Tg of the COPE in the present disclosure can be lowered even more by adding different amounts of the miscible polyester plasticizer to obtain a desired Tg value, so that the carrier film can be stretched at even lower temperatures.

In various embodiments, the Tg of the COPE can be reduced to 40° C. or below with an increase of the polyester plasticizer content. Therefore, the carrier films of the present disclosure can be stretched at desired lower temperatures by adjusting the amount of plasticizer.

For example, in some embodiments, in a dry process, the carrier films of the present disclosure can be stretched at temperature of 80° C. or less, or even 70° C. or less. And in some other embodiments, in a dry process, the carrier films and dry laminates can be stretched at temperature of 65° C. or less, or 60° C. or less. In some embodiments, in a dry process, the stretching temperature is 5 to 30° C., or 10 to 20° C., above the Tg of the film. The feature(s) mentioned in this paragraph may be applied to any embodiment and any combination of embodiments in this disclosure.

In the present disclosure, the COPE can absorb moisture, so in a wet process, the water acts as a second plasticizer that effectively suppresses the Tg even further, allowing for even lower stretching temperatures. As such, in the present disclosure, the "true" Tg of the carrier film is the Tg after moisture absorption or moisture uptake, and the true Tg is used to determine the stretching temperature of the carrier films. For example, low stretching temperatures in a wet process, such as, for example, 70° C. or less, 60° C. or less, 55° C. or less, or 50° C. or less can be obtained. The low stretching temperatures minimizes PVA crystallinity, improves the draw ratio, and enhances the overall polarization efficiency of the polarizer. In addition, low temperature stretching decreases the PVA dissolution rate in the wet process. The feature(s) mentioned in this paragraph may be applied to any embodiment and any combination of embodiments in this disclosure.

Thus, in a wet process, the Tg of the COPE in the present disclosure can be adjusted and lowered by adding different amounts of a miscible polyester plasticizer to obtain the desired Tg value so that the carrier film can be stretched at lower temperatures.

In various embodiments, in a wet process, the stretching temperature is from 5 to 30° C. above the "true" Tg of the film. In various other embodiments, the stretching temperature is from 10 to 20° C. above the "true" Tg of the film. The feature(s) mentioned in this paragraph may be applied to any embodiment and any combination of embodiments in this disclosure.

Laminates, PVA Films, and Polarizers

Another aspect of the present disclosure relates to laminates comprising (I) a polyvinyl alcohol-based film and (II) a polyester-based film as described herein. The polyester-based film (II) may be made from the COPE (A) with or without the plasticizer (B).

In various embodiments, the laminates are transparent optical laminates.

Any polyvinyl alcohol-based resin (PVA) may be used to form the PVA film (I) of the present disclosure. For example, in various embodiments, the PVA-based resin is fully hydrolyzed poly(vinyl alcohol). In various other embodiments, the PVA-based resins may include PVA and ethylene-vinyl alcohol copolymers.

The average polymerization degree of the PVA-based resin may be selected based on the intended application. For example, in various embodiments, the average degree of polymerization can range from 1,000 to 5,000.

The laminates according to the present disclosure can be made by forming a PVA layer on the carrier film. The PVA layer may be formed on the carrier film using any suitable casting or coating method. Alternatively, the laminates can be made by adhering a pre-formed PVA film onto the carrier film. An adhesive layer may be used to adhere the PVA film to the carrier film.

Any suitable method may be used to cast or coat the PVA layer onto the carrier film. Suitable methods include, for example, a roll coating method, a spin coating method, a wire bar coating method, a dip coating method, a die coating method, a curtain coating method, a spray coating method, and a knife coating method, etc.

The casting or coating method usually involves first dissolving the PVA-based resin in a suitable solvent. Suitable solvents include, for example, water; dimethylsulfoxide; dimethylformamide; dimethylacetamide; N-methylpyrrolidone; various glycols; polyhydric alcohols, such as trimethylolpropane; and amines, such as ethylenediamine and diethylenetriamine. These solvents may be used alone or in a combination with other solvents. Typical concentrations of the PVA-based resin in the casting or coating solution include, for example, from 3 to 20 parts per 100 parts of solvent by weight.

Additives may be added to the casting or coating solution. For example, possible additives include surfactants and additional plasticizers. Examples of surfactants include nonionic surfactants. Examples of additional plasticizers include polyhydric alcohols, such as ethylene glycol and glycerin. These additives may be used to further enhance the uniformity, dyeability, and/or stretchability of the PVA-based layers or films.

After dissolving the PVA-based resin in a suitable solvent, the resulting solution is then typically applied onto the carrier film. The laminate can then be dried, typically at an elevated temperature, such as 50° C. or higher.

Alternatively, the PVA-based film may be pre-formed by conventional methods, such as solvent casting, and then laminated onto the carrier film.

Before contact with PVA either as a coating/casting solution or a pre-formed film, the carrier film may be subjected to a surface treatment to enhance adhesion between the carrier film and the PVA-based film. The surface treatment may include any commonly known method, such as corona processing, plasma processing, surface modification processing using a strong alkali aqueous solution, such as NaOH or KOH, or the like.

In various embodiments, the laminate may include an adhesive layer between the PVA-based film and the carrier film. Typically, the adhesive layer would be applied onto the carrier film before applying the PVA layer. The materials of the adhesive layer are not limited, and any commonly known adhesives may be used without limitation. For example, the adhesive layer may be formed using a water-based adhesive or a solvent-based adhesive.

Examples of water-based adhesives include polyvinyl alcohol-based adhesives, acrylic adhesives, and vinyl acetate-based adhesives. Examples of other water-based adhesives include those containing an acetoacetyl group or an acrylic group, and hydroxyl group-containing polyvinyl alcohol-based resins.

The adhesive layer may be applied using any known method, such as those discussed above for the carrier films and the PVA films, including, but not limited to, calendering and extrusion.

In various embodiments, the PVA-based films, before stretching, can have a thickness of 40 μm or less, 30 μm or less, or 20 μm or less. Typically, the PVA-based films, before stretching, have a thickness in the range of 10 μm or higher, 15 μm or higher, or 20 μm or higher and in each case, up to 20 μm, up to 30 μm, or up to 40 μm.

In various embodiments, the laminates of the present disclosure are desirably stretched to form thinner PVA-based films.

The stretching direction of the PVA/carrier laminate is not restricted in any way. For example, the laminate may be stretched in either the machine direction or the transverse direction, or both.

In various embodiments, the laminates are uniaxially stretched in the machine direction.

The laminates can be stretched from 2 to 7 times their original measurements. For example, the laminates can be stretched at a stretch ratio of 5 times or more, 5.5 times or more, 6 times or more, or 7 times.

The laminates of the present disclosure may be stretched using any suitable stretching method. For example, in various embodiments, the stretching method may be fixed-end stretching or may be free-end stretching (or a method in which the laminate is subjected to uniaxial stretching while passing between two rolls having different circumferential velocities). The stretching of the laminate may be performed in a single-stage manner or may be performed in a multi-stage manner.

The laminates may be stretched in air or underwater.

In various embodiments, the laminate is stretched at 5° C. to 30° C. above the glass transition temperature ($T_g$) of the carrier film. In various other embodiments, the laminate is stretched at 10° C. to 20° C., or 10° to 15° C. above the $T_g$ of the carrier film.

In various embodiments, the strain rate for the stretching can range from 5% to 500%, including 100%. The feature(s)

mentioned in this paragraph may be applied to any embodiment and any combination of embodiments in this disclosure.

In various embodiments, the laminate has been stretched, in air, at least 5× in the machine direction at a temperature of 700° C. or below.

In a dry process, the laminate is typically stretched using a stretching apparatus in a heated oven, so that the PVA layer is stretched together with the carrier film layer.

In various embodiments, the laminates of the present disclosure are stretched underwater (also known as in-water stretching or a wet stretching process). The in-water stretching is preferably performed by immersing the laminate in a boric acid aqueous solution. The use of boric acid provides some rigidity to the PVA layer to withstand the tension imposed during the stretching, and provides some water resistance to prevent dissolution of the PVA into the water.

The boric acid aqueous solution can be obtained by dissolving a boric acid and/or a borate, or by dissolving a boron compound that generates boric acid, such as borax, in water. The solution typically contains from 1 to 10 parts of boric acid per 100 parts of water by weight.

In various embodiments, the stretching temperature is in the range of 40° C. to 85° C. In various other embodiments, the stretching temperature is in the range of 50° C. to 70° C. Temperatures within these ranges make it possible to stretch the PVA layer at a high stretch ratio while suppressing the dissolution of the PVA layer.

In various embodiments, the laminate is immersed in the stretching solution bath for 5 seconds to 5 minutes, or for 15 seconds to 5 minutes.

A wet process makes it possible to perform the stretching at a lower temperature and a higher stretch ratio to form ultra-thin polarizers with excellent optical properties. For example, using a wet stretching process, it is possible to obtain a maximum stretching ratio of 5.0 times or more with respect to an original dimension of the laminate. "Maximum stretching ratio," means the stretch ratio just before the laminate breaks. For example, it is a value less than the stretch ratio that causes the laminate to break by about 0.2 (if the laminate breaks at a stretch ration of 5.2×, then the maximum stretch ratio is 5×).

In various embodiments, the laminate has been stretched, in an aqueous solution comprising boric acid and optionally a dye, at least 6× in the machine direction at a temperature of 60° C. or below.

In various other embodiments, the laminate has been stretched, in an aqueous solution comprising boric acid and optionally a dye, at least 7× in the machine direction at a temperature of 60° C. or below.

After stretching, the PVA films can have a thickness of 10 µm or less, 7 µm or less, or even 5 µm or less.

Another aspect of the present disclosure provides a method of producing thin-film polarizers.

In various embodiments, the method comprises the steps of:
(i) forming a polyvinyl alcohol-based film (I) on a substrate comprising a polyester-based film (II) to obtain a laminate;
(ii) contacting the laminate with a dyeing liquid to dye the polyvinyl alcohol-based film (I);
(iii) stretching the laminate so that the polyvinyl alcohol-based film (I) has a thickness of 10 µm or less after stretching; and
(iv) separating the polyvinyl alcohol-based film (I) from the substrate to obtain a thin-film polarizer.

Both the PVA-based film (I) and the polyester-based film (II) are as described herein as well as the stretching step (iii).

In various embodiments, the stretching step (iii) is conducted, in air, at a stretch ratio of at least 5× in the machine direction and at a temperature of 70° C. or below.

In various embodiments, the stretching step (iii) is conducted, in an aqueous solution comprising boric acid and optionally a dye, at a stretch ratio of at least 6× in the machine direction and at a temperature of 60° C. or below.

In various embodiments, the stretching step (iii) is conducted, in an aqueous solution comprising boric acid and optionally a dye, at a stretch ratio of at least 7× in the machine direction and at a temperature of 60° C. or below.

As noted above, in various embodiments, the laminate may further comprise an adhesive layer between the polyvinyl alcohol-based film (I) and the polyester-based film (II).

In various embodiments, the method comprises the steps of:
(i) casting a PVA layer on a carrier film to form a laminate;
(ii) dyeing the PVA film with dichroic dye, iodine, and/or iodide;
(iii) stretching the laminate in an aqueous solution comprising boric acid; and
(iv) separating the PVA layer from the carrier film after stretching to obtain a polarizer.

In various embodiments, the method comprises the steps of:
(i) laminating a PVA film onto a carrier film to form a laminate;
(ii) dyeing the PVA film with dichroic dye, iodine, and/or iodide;
(iii) stretching the laminate in an aqueous solution comprising boric acid; and
(iv) separating the PVA film from the carrier film after stretching to obtain a polarizer.

In various embodiments, the method comprises the steps of:
(i) laminating a PVA film or casting a PVA layer on a carrier film to form a laminate;
(ii) dyeing the PVA film or layer with dichroic dye, iodine, and/or iodide;
(iii) stretching the laminate in air; and
(iv) separating the PVA film or layer from the carrier film after stretching to obtain polarizer.

In these various method embodiments, the PVA layer/film and the carrier film are as described herein as well as the casting/laminating (i) and stretching (iii) steps.

In these various embodiments, the PVA film is dyed with iodine and/or a dichroic dye. Any dyeing method can be used so long as the PVA film adsorbs and/or absorbs the dye. For example, the PVA film may be immersed or dipped in a dyeing solution. Alternatively, the dyeing solution can be applied or coated onto the PVA film. The dyeing solution may also be sprayed onto the PVA film.

To enhance the solubility of the iodine, an iodide compound may be blended with the aqueous iodine solution. Suitable iodide compounds include, for example, potassium iodide, lithium iodide, sodium iodide, zinc iodide, aluminum iodide, lead iodide, copper iodide, barium iodide, calcium iodide, tin iodide, titanium iodide, and mixtures thereof.

In various embodiments, the dyeing solution is an aqueous iodine and/or dichroic solution. Water is typically used as the solvent in the dyeing solution, but any organic solvent having compatibility with water may also be mixed with water. For example, the iodine/iodide can be blended with water in an amount of 0.1 to 10 parts per 100 parts of water by weight.

The temperature of the dyeing solution during the dyeing process is typically in the range of 20° C. to 50° C. When the PVA film or layer is immersed in the dyeing solution, an immersion time of 5 seconds to 5 minutes is normally sufficient.

In various embodiments, after dyeing the PVA film, the laminate is subjected to in-water stretching. For example, the laminate may be stretched in an aqueous boric acid solution.

The in-water stretching can performed at temperatures less than the glass transition temperature of the substrate and the PVA-based resin layer (which is about 80° C.). This stretching can occur at a high stretch ratio while suppressing crystallization. Thus, it becomes possible to form an ultra-thin polarizing film having excellent optical properties.

In various embodiments, the PVA-based films, after stretching, can have a single axis transmittance of at least 42%, a polarization degree of at least 99.95%, and/or a contrast ratio of at least 2000:1.

These stretched PVA-based films are particularly useful as polarizers in display devices, such as LCD and OLED displays.

Thus, the present disclosure also provides a polarizing plate which comprises the ultra-thin film polarizer produced according to one or more of the methods described herein.

The present disclosure also provides a display device which comprises a polarizing plate as described herein.

In summary, the present disclosure improves the PVA production both in dry (in air) process and wet (in water) processes. Since water itself is also an effective plasticizer for the COPE, the wet process can provide some additional advantages over the dry process.

For the dry process, to stretch below 70° C. is generally not possible when an APET carrier film with a Tg of about 80° C. is used. The strain-induced crystallization in APET during stretching prevents high elongation without fracture. It is achievable, however, with the COPE films of the present disclosure, because the polyester plasticizers can reduce the Tg to 60° C. or less from the original Tg of about 70° C. Also, there is minimal, if any, strain-induced crystallization in the COPE films during stretching, which allows the films to be stretched and elongated further without rupture.

For the wet process, to decrease the Tg of APET using water as a plasticizer to a temperature below 60° C. is difficult, because its original Tg is so high. Also, strain-induced crystallization is still an issue so the APET film elongation is highly constrained. On the other hand, with the addition of water acting as a plasticizer, the amount of polyester plasticizer needed in the COPE of the present disclosure can be reduced so that the final Tg, affected by water and plasticizer together, can easily reach 60° C. or less for low temperature stretching. In addition, there is minimal, if any, strain-induced crystallization to hamper the elongation of the plasticized COPE. Hence, a higher draw ratio can be used to produce an ultra-thin, uniform, and high-performance PVA films.

To remove any doubt, the present disclosure clearly and unambiguously includes and expressly contemplates and discloses any and all combinations of embodiments, features, characteristics, parameters, and/or ranges mentioned herein. That is, the subject matter of the present disclosure may be defined by any combination of embodiments, features, characteristics, parameters, and/or ranges mentioned herein.

It is contemplated that any ingredient, component, or step that is not specifically named or identified as part of the present disclosure may be explicitly excluded.

Any process/method, apparatus, compound, composition, embodiment, or component of the present disclosure may be modified by the transitional terms "comprising," "consisting essentially of," or "consisting of," or variations of those terms.

As used herein, the indefinite articles "a" and "an" mean one or more, unless the context clearly suggests otherwise. Similarly, the singular form of nouns includes their plural form, and vice versa, unless the context clearly suggests otherwise.

While attempts have been made to be precise, the numerical values and ranges described herein should be considered as approximations. These values and ranges may vary from their stated numbers depending upon the desired properties sought to be obtained by the present disclosure as well as the variations resulting from the standard deviation found in the measuring techniques. Moreover, the ranges described herein are intended and specifically contemplated to include all sub-ranges and values within the stated ranges. For example, a range of 50 to 100 is intended to include all values within the range including sub-ranges such as 60 to 90, 70 to 80, etc.

Any two numbers of the same property or parameter reported in the working examples may define a range. Those numbers may be rounded off to the nearest thousandth, hundredth, tenth, whole number, ten, hundred, or thousand to define the range.

The content of all documents cited herein, including patents as well as non-patent literature, is hereby incorporated by reference in their entirety.

To the extent that any incorporated subject matter contradicts with any disclosure herein, the disclosure herein shall take precedence over the incorporated content.

This disclosure can be further illustrated by the following examples of embodiments consistent with the present teachings, although it will be understood that these examples are included merely for purposes of illustration and are not intended to limit the scope of the disclosure. Unless otherwise indicated, all percentages are by weight.

EXAMPLES

Materials

The amorphous poly(ethylene terephthalate) (APET) used in the following examples was obtained from Nitto Denko Corp. The APET has a Tg of 80° C.

The copolyester (COPE) used in the following examples is commercially available from Eastman Chemical Company under the name Embrace™ LV. The COPE contains as the diacid component 100 mole % of terephthalic acid residues, and as the diol component 65 mole % of ethylene glycol residues, 23 mole % of cyclohexanedimethanol residues, and 12 mole % of diethylene glycol residues. The COPE has a Tg of 69° C.

The miscible polyester plasticizer (PZ) used in the following examples is commercially available from Eastman Chemical Company under the name Admex™ 6995. The PZ contains as the diacid component 100 mole % of adipic acid residues, and as the diol component 100 mole % of 1,2-propanediol and 1,4-butanediol residues ($M_w$=3,217 g/mol).

Analytical

All Tg's for the APET-containing samples were measured in a DSC by heating the sample to 300° C. at 20° C./min, quenching to −20° C., and then heating to 300° C. again. The Tg was taken from the $2^{nd}$ heating cycle in a nitrogen atmosphere.

All Tg's for the COPE-containing samples were measured in a DSC by heating the sample to 280° C. at 20° C./min, quenching to −20° C., and then heating to 280° C. again. The Tg was taken from the 2$^{nd}$ heating cycle in a nitrogen atmosphere.

As previously noted, APET film is amorphous and exhibits fast-quenching rates on chill rolls during extrusion. However, APET tends to crystallize during stretching via strain-induced crystallization (sometimes referred to as stress-induced crystallization). This stain-induced crystallization results in a rapid rise in the force required for stretching due to strain hardening of the film, so the film can break abruptly at a relatively low draw ratio. This effect is shown in Comparative Example 1.

Comparative Example 1

A 4×4 in. 500 μm-thick film sample was made from the APET. The sample was submerged in a water bath at room temperature (RT) for 72 hours (wet sample).

A separate 4×4 in. 500 μm-thick film sample was made from the same APET. The sample was dried under vacuum at 60° C. for 72 hours (dry sample).

Both samples were then stretched in air in a laboratory film stretcher (from Bruckner Maschinenbau GmbH & Co. KG) in the machine direction at 95° C., which is 15° C. above the Tg of APET, at a strain rate of 100%.

FIG. 1 shows the stretching characteristics of both the wet and the dry film samples.

As seen from FIG. 1, the dry APET sample started to crystallize at a draw ratio of about 3×. Due to strain-induced crystallization, the stretching force increased drastically, and the sample fractured at a draw ratio of about 4×. It took less force to stretch the wet sample at the same temperature, and the wet sample did not break at a draw ratio of 4×. But the wet sample could not avoid the strain-induced crystallization hardening effect, as reflected by the large increase in the force required for stretching.

The true Tg of the wet sample, which was plasticized by the water, is actually lower than 80° C. This means that, in theory, the wet sample can be stretched at a lower temperature. However, if the stretching temperature of the wet APET sample were lowered, a force-elongation curve similar to that of the dry APET would result. Thus, strain-induced crystallization negatively affects the elongation at break of APET samples, regardless of their moisture content.

Due to strain-induced crystallization, it is very difficult, if not impossible, to stretch APET beyond 5×. Since a high draw ratio is needed to produce ultra-thin PVA polarizers, APET is not a particularly suitable material to use as a carrier film for this purpose.

Example 1

A 4×4 in. 200 μm-thick film sample was made from the COPE. Using the sample equipment and strain rate as Comparative Example 1, the COPE sample was stretched in the machine direction at 80° C., which is about 10° C. above its Tg.

Figure 2:
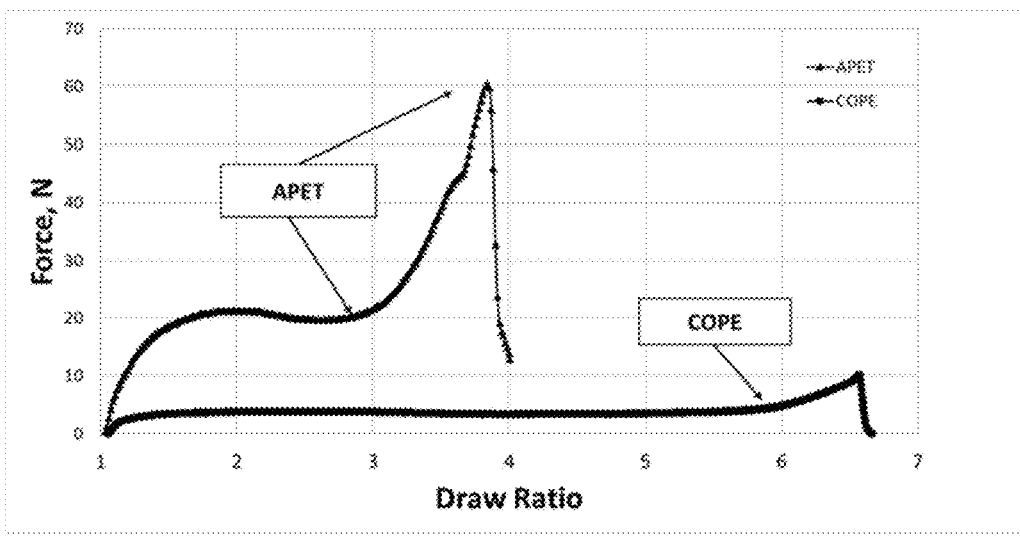
FIG. 2 illustrates the improved stretching characteristics of a copolyester (COPE) film in comparison with a crystallizable APET film.

FIG. 2 shows the stretching characteristics of the COPE film, along with those of the dry APET sample from Comparative Example 1.

As seen in FIG. 2, unlike the APET sample (which was stretched at 95° C.), this COPE sample could be stretched at a lower temperature using much less force, even when the force is converted into stress to account for the difference in thickness. The COPE sample even reached a draw ratio of 6× without rupture.

Thus, a substantially amorphous copolyester film, with the compositions and Tg's defined by this disclosure, can be oriented with lower force and with minimal stress-induced crystallization or strain-hardening to a greater draw ratio, compared to APET.

However, it is still a challenge to stretch a COPE film to a high draw ratio at 70° C. or below, even in a wet process.

To overcome stretching difficulties at lower temperatures, this disclosure utilizes a miscible polyester plasticizer (PZ) to reduce the Tg of the COPE so that it can be stretched below 70° C., or even below 65° C., in a dry process. With the combined effect of the PZ and moisture in a wet process, films according to the present disclosure can be stretched below 60° C. Example 2 and FIG. 3 demonstrate this concept.

Example 2

A 4×4 in. 200 μm-thick film sample was made from the COPE alone.

A 4×4 in. 200 μm-thick film sample was made from the COPE with 7 wt % of the PZ.

Using the same equipment and strain rate as Comparative Example 1, both film samples were stretched in air in the machine direction at 80° C.

Figure 3:
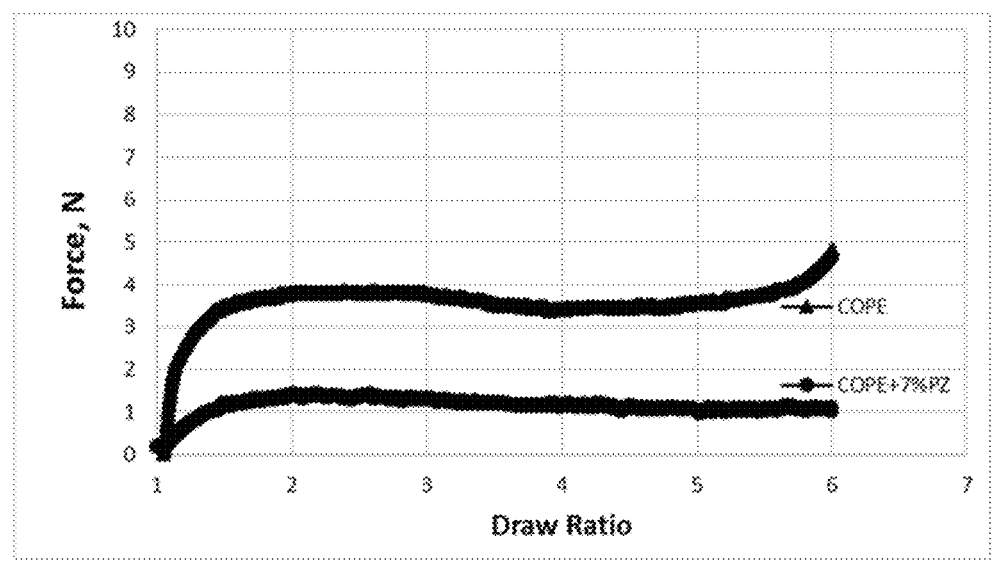
FIG. 3 illustrates the stretching characteristics of the COPE and the COPE with 7 wt % of a polyester plasticizer.

FIG. 3 shows the stretching characteristics of both films.

As seen in FIG. 3, both samples were able to be elongated to a draw ratio of 6× without fracture. The COPE curve has a small force upswing at the end of the curve. This upswing was determined to not be from stress-induced crystallization, but from a self-leveling effect due to high molecular orientation. After stretching, the COPE film was melted and the degree of crystallinity was measured by differential scanning calorimetry (DSC). The COPE film sample had 0% crystallinity.

The plasticized sample required a lower stretching force, which indicates that it can be oriented at even lower temperatures.

Comparative Example 2

Tg Reduction by Moisture Uptake in APET

Samples of the APET film (100×100 mm; 200 μm-thick) were immersed in 23° C. water for various lengths of time, and their Tg's were measured.

The amount of moisture uptake from 0% (dry) to 0.8% (saturated) by weight and respective Tg's of the APET samples are shown in Table 1.

TABLE 1

| Influence of Water Absorption on $T_g$ of APET | |
| --- | --- |
| Moisture Content in APET (wt %) | $T_g$ (° C.) |
| 0 | 78 |
| 0.17 | 77.5 |
| 0.42 | 73.3 |
| 0.64 | 67 |
| 0.80 | 62.5 |

Figure 4:
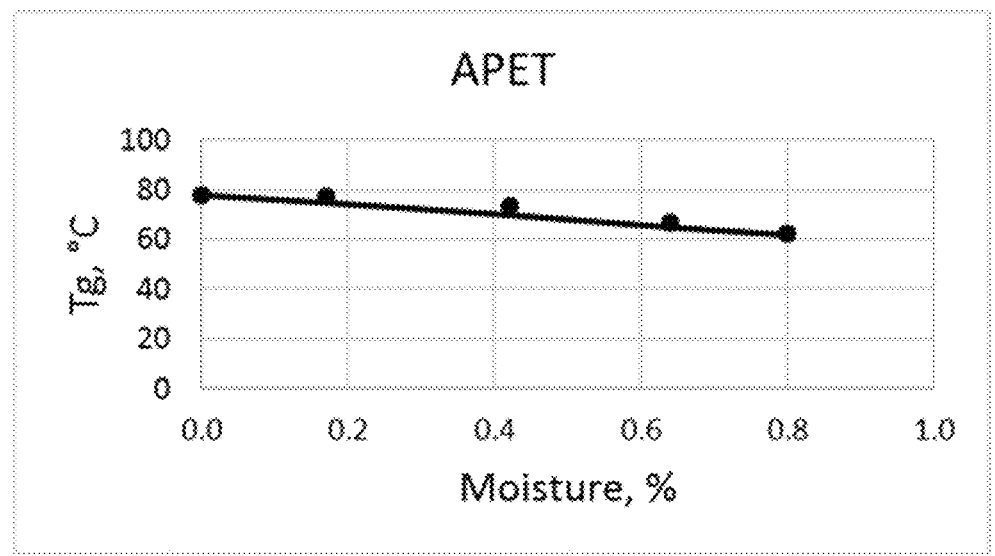
FIG. 4 illustrates the reduction in the Tg of the APET due to moisture uptake.

FIG. 4 is an x-y plot of the data in Table 1.

Equation (1) is the linear regression from FIG. 4:

$$Tg = -20 * X\% + 78 \quad (1)$$

where Tg is the glass transition temperature (° C.) and X % is the net weight percentage of moisture in the polymer.

In general, water diffuses very slowly into the polymer matrix, and the rate of diffusion depends on the temperature of the sample. The total amount of moisture saturation in a polyester matrix is normally below 1 wt %. During film production, the soaking time is generally limited by the length of the water bath and the line speed used. The stretching temperature is typically about 10° C. above the true Tg of the film.

As seen in Table 1, water was effective in lowering the Tg of the APET. But when it was saturated with moisture, the film's true Tg was only 62.5° C. Thus, the lowest stretching temperature of an APET film is, at best, about 70° C.

Example 3

Tg Reduction by Moisture Uptake in COPE

Samples of the COPE film (100×100 mm; 200 μm-thick) were immersed in 23° C. water for various lengths of time, and their Tg's were measured.

The amount of moisture uptake from 0% (dry) to 0.84% (saturated) by weight and respective Tg's of the COPE samples are shown in Table 2.

TABLE 2

Influence of Water Absorption on $T_g$ of COPE

| Moisture Content in COPE (wt %) | $T_g$ (° C.) |
|---|---|
| 0 | 68 |
| 0.32 | 58 |
| 0.49 | 56 |
| 0.65 | 54 |
| 0.84 | 48 |

Figure 5:
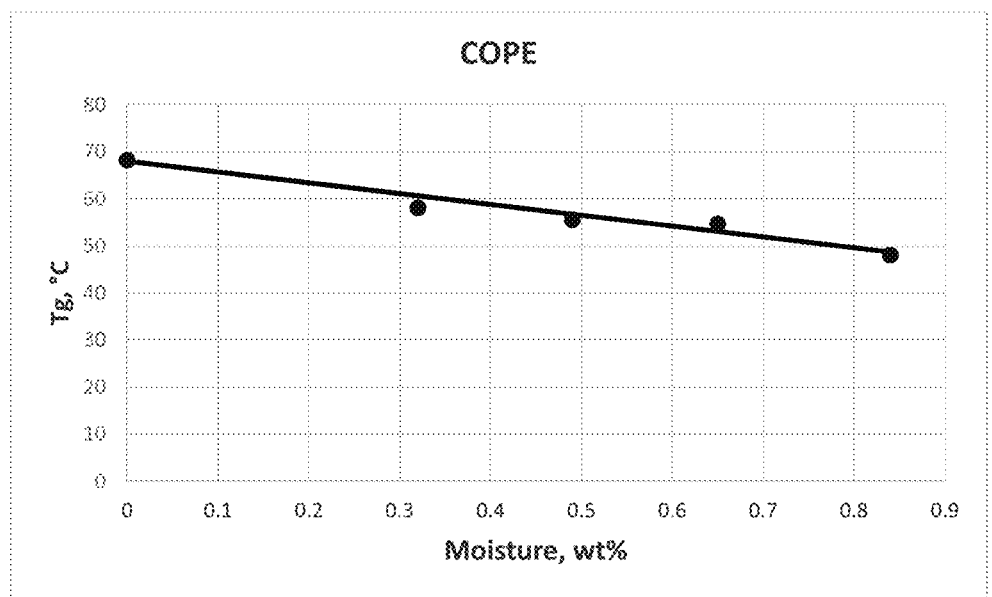
FIG. 5 illustrates the reduction in the Tg of the COPE due to moisture uptake.

FIG. 5 is an x-y plot of the data in Table 2.
Equation (2) is the linear regression from FIG. 5:

$$Tg = -23*X\% + 68 \quad (2)$$

where Tg is the glass transition temperature (° C.) and X % is the net weight percentage of moisture in the polymer.

As seen from Tables 1 and 2, the COPE absorbed slightly more water than the APET. Moisture was more effective in reducing the Tg of the COPE (slope ~−23 in Equation (2)) than of the APET (slope ~−20 in Equation (1)). When it was saturated with moisture, the Tg of the COPE was below 50° C. Therefore, the COPE film can be stretched below 60° C. when it has a high moisture uptake.

Example 4

Tg Reduction by Plasticizer in COPE

The COPE was blended with up to 10 wt % of the PZ, and their Tg's were measured.

The amount of PZ in the COPE samples and their respective Tg's are shown in Table 3.

TABLE 3

Influence of PZ Content on Tg of COPE

| Plasticizer Content in COPE (wt %) | $T_g$ (° C.) |
|---|---|
| 0% | 68 |
| 4% | 54 |
| 5.5% | 49 |
| 7% | 46 |
| 10% | 36 |

As seen from Table 3, when loaded with 10 wt % of PZ, the Tg of the COPE was below 40° C. Therefore, the COPE can be stretched below 60° C. when it contains enough plasticizer.

Figure 6:
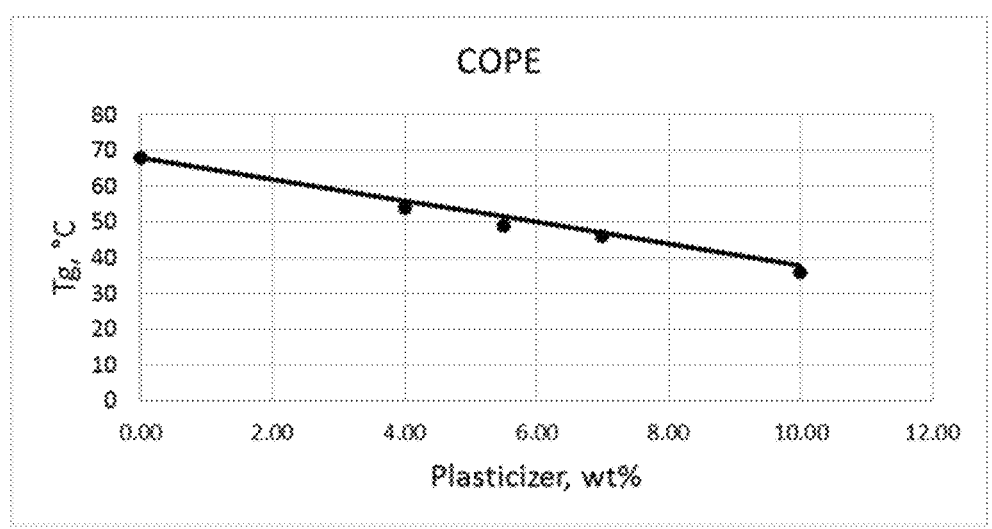
FIG. 6 illustrates the reduction in the Tg of the COPE with the addition of a polyester plasticizer.

FIG. 6 is an x-y plot of the data in Table 3.
Equation (3) is the linear regression from FIG. 6:

$$Tg = -3*PZ\% + 68 \quad (3)$$

where Tg is the glass transition temperature (° C.) and PZ % is the net weight percentage of plasticizer in the polymer.

The Tg reduction by adding plasticizer (PZ) in the COPE can be approximated using Equation (3).

For plasticized COPE films in a wet stretching process, Equations (2) and (3) can be combined into Equation (4) to control the Tg of the COPE film.

$$Tg = (-23*X\%) + (-3*PZ\%) + 68 \quad (4)$$

Figure 7:
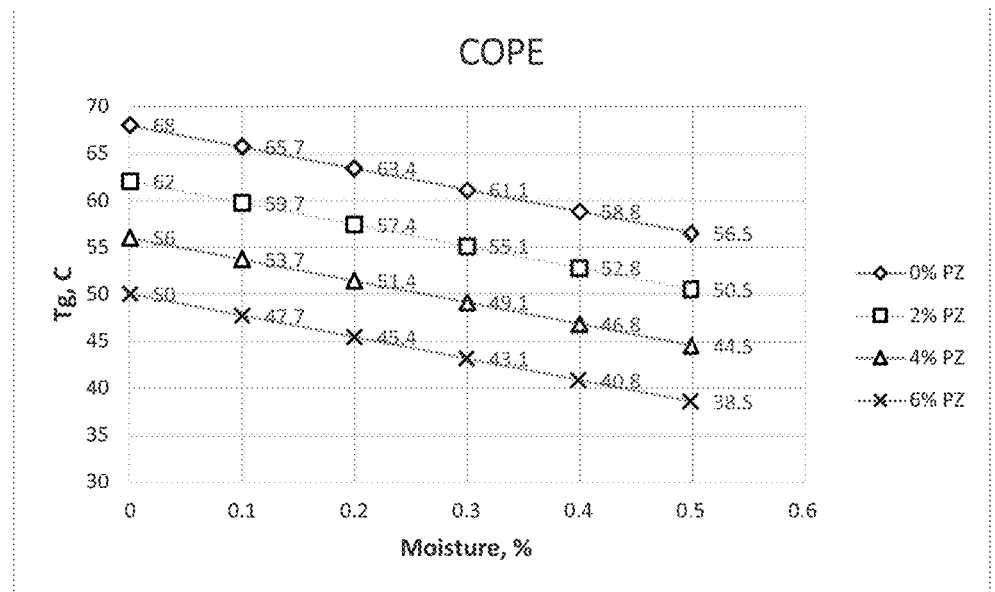
FIG. 7 illustrates the reduction in the Tg of the COPE due to the combined effect of adding polyester plasticizer and moisture uptake.

FIG. 7 is a graph of the calculated results using Equation (4). It shows the $T_g$ of a COPE film based on its moisture content and plasticizer amount. It provides a roadmap to achieve a desired Tg when the moisture content in the COPE is measured, so the plasticizer content can be adjusted accordingly during carrier film production.

In general, the COPE films are hygroscopic; they tend absorb moisture from the environment at room temperature. Therefore, it may be desirable to store the films in a controlled environment with fixed temperature and relative humidity (RH %), so that the initial moisture content would be a constant. In case the initial film moisture content is not constant, FIG. 7 can be used to determine the best stretching temperature for that particular moisture and plasticizer content to produce a consistent PVA product.

Figure 8:
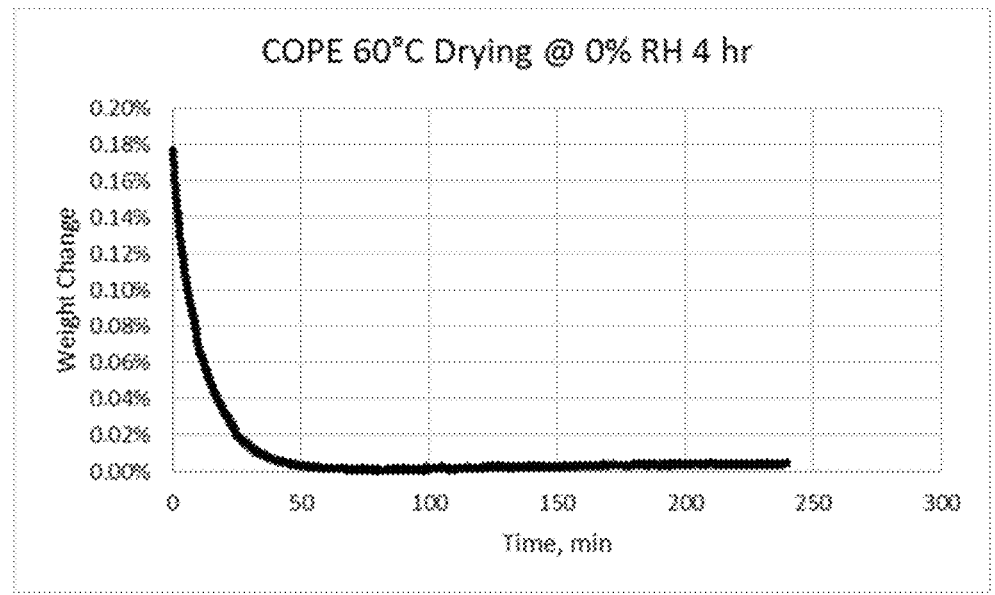
FIG. 8 illustrates the weight loss due to drying of the COPE at 60° C. and 0% relative humidity (RH) for 4 hours.
Figure 9:
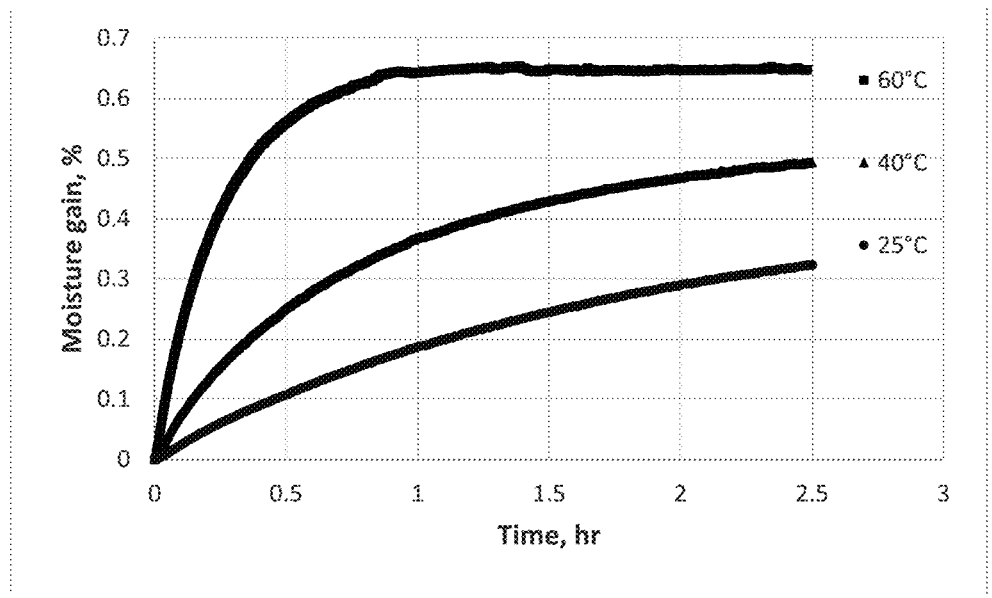
FIG. 9 illustrates the weight gain due to water uptake by the COPE at different temperatures and 90% RH.
Figure 10:
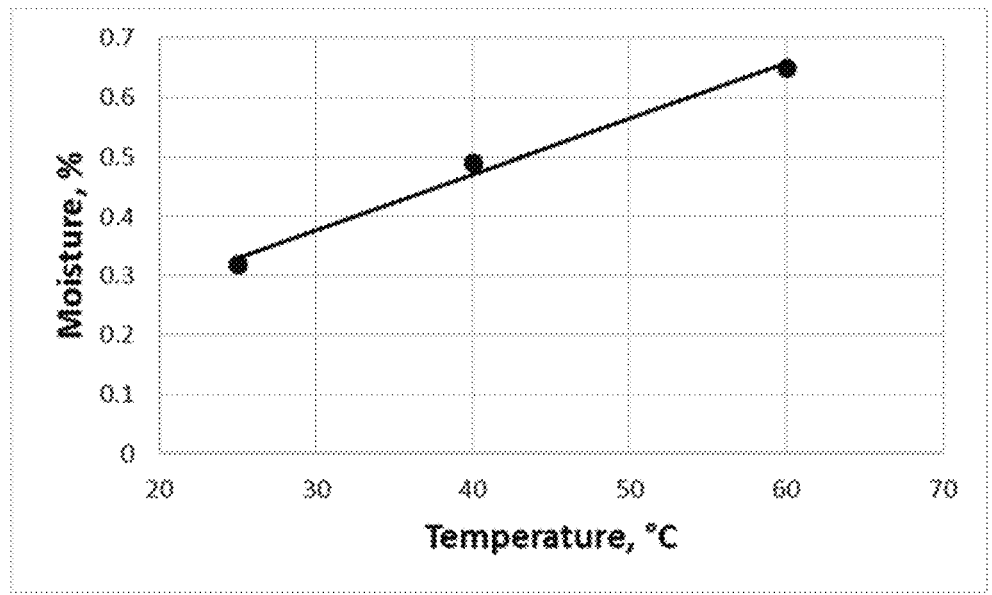
FIG. 10 illustrates the moisture uptake in the COPE at different temperatures and 90 RH % after 2.5 hours.

FIGS. 8-10 illustrate the above concept. FIG. 8 shows the weight loss of a COPE film (with no PZ), which was stored at room temperature and about 50% RH, when dried at 60° C. and 0% RH over a 4-hour period. The film initially contained about 0.18 wt % of moisture. From FIG. 7, the true Tg for the COPE film with 4 wt % plasticizer is about 51.4° C., so a 60° C. stretching temperature in a dry process can be used.

This determination can be more difficult for a wet stretching process.

FIG. 9 shows the moisture absorption rate of a dried COPE film at three different temperatures (25° C., 40° C., and 60° C.) and 90% RH.

FIG. 10 shows the moisture absorption of the dried COPE film after 2.5 hours at the three different temperatures from FIG. 9.

According to FIG. 9, at 25° C. and 90% RH, a COPE film would gain about 0.3 wt % moisture in 2 hours. However, in production, the actual exposure time to water would be much shorter; it is constrained by the water bath length and line speed. Fortunately, FIGS. 9 and 10 show that water absorption can be accelerated by increasing the water temperature.

Developing an optimal COPE carrier film for a wet process involves some iterations to determine the equilibrium moisture in storage and the additional moisture uptake in the production line using the data in FIG. 9. For example, 0.2 wt % was the equilibrated water content in the COPE film when stored in a controlled environment, and 0.1 wt % was the additional moisture pickup from the production line under a desired stretching temperature of 60° C. and line speed. The total moisture in the COPE film would be 0.3 wt %. From FIG. 5 or Equation (2), the Tg of the COPE with a 0.3 wt % moisture content is about 60° C. This Tg is not low enough for stretching at 60° C. Typically, carrier films are stretched at 10° C. above their Tg, so the true Tg of the COPE would need to be 50° C. or less to be stretched at 60° C. As seen in FIG. 7, for a film with 0.3 wt % moisture content and a Tg of 50° C., the COPE would need about 4 wt % of the plasticizer.

Comparative Example 3 and Example 5

Comparative Example 3 used a 4×4 in. APET film with a thickness of 150 μm.

Example 5 used a 4×4 in. COPE film with a thickness of 200 μm.

Both film samples were stretched in the machine direction, in air, using a Bruckner film stretcher and a strain rate of 100%. The stretching temperatures, ratios, and results of both films are reported in Table 5.

TABLE 5

In-Air Stretching Results of APET and COPE Films

| Draw Ratio | Comparative Example 3 APET Stretching Temperature | | | Example 5 COPE Stretching Temperature | | |
|---|---|---|---|---|---|---|
| | 60° C. | 70° C. | 80° C. | 60° C. | 70° C. | 80° C. |
| 4X | x | x | o | x | o | o |
| 4.5X | x | x | o | x | Δ | o |
| 5X | x | x | x | x | x | o |
| 5.5X | | x | x | | x | o |
| 6X | | | | | | o | o - good (clear, no breakage after stretching)
x - bad (broke after stretching)
Δ - fair (slightly hazy, no breakage after stretching)

As seen in Table 5, the APET film sample failed at stretch temperatures of 60° C. and 70° C. at each draw ratio. The APET sample had limited success at 80° C. and a draw ratio of 4.5× or less. The COPE film sample had limited success at 70° C. and a draw ratio of 4.5× or less, but passed with a draw ratio of 6× at 80° C.

Since carrier films are typically stretched at 10° C. above their true Tg's, a comfortable stretching temperature in air is about 90° C. for APET and about 80° C. for COPE. However, the maximum draw ratio for APET films is low due to strain-induced crystallization, as demonstrated in FIG. 2 and Table 5. COPE films, on the other hand, can be stretched up to 6× in air at 80° C. with minimal, if any, strain-induced crystallization, as demonstrated in FIG. 2 and Table 5.

Examples 6-8

COPE Films with Plasticizer

Example 6 used a 4×4 in. COPE film (200 μm-thick) containing 4 wt % of PZ (Tg=54° C.).

Example 7 used a 4×4 in. COPE film (200 μm-thick) containing 5.5 wt % of PZ (Tg=49° C.).

Example 8 used a 4×4 in. COPE film (200 μm-thick) containing 7 wt % of PZ (Tg=46° C.).

All film samples were stretched in the machine direction, in air, using a Bruckner film stretcher and a strain rate of 100% at 55° C. and 60° C.

The results are reported in Table 6.

TABLE 6

Stretching Results of COPE Films with Various Plasticizer Content

| Draw Ratio | Example 6 (4 wt % PZ) Stretching Temperature | | Example 7 (5.5 wt % PZ) Stretching Temperature | | Example 8 (7 wt % PZ) Stretching Temperature | |
|---|---|---|---|---|---|---|
| | 55° C. | 60° C. | 55° C. | 60° C. | 55° C. | 60° C. |
| 4X | o | o | o | o | o | o |
| 4.5X | o | o | o | o | o | o |
| 5X | X | Δ | x | o | x | o | o - good (clear, no breakage after stretching)
x - bad (broke after stretching)
Δ - fair (slightly hazy, no breakage after stretching)

As seen in Table 6, all samples were successfully stretched in air at 60° C., up to 5×.

If a wet stretching process were used, it is feasible to stretch these films at 60° C. to even a higher draw ratio, such as 6× or 7×.

Examples of Statements of Embodiments

1. A polyester-based film made from a blend comprising:
   (A) a copolyester; and
   (B) a polyester plasticizer having a weight-average molecular weight ($M_w$) of 900 to 12,000 g/mol,
   wherein the polyester-based film has been stretched underwater;
   wherein the copolyester (A) comprises:
     (a) a diacid component comprising at least 50 mole percent of residues of terephthalic acid, naphthalenedicarboxylic acid, 1,4-cyclohexanedicarboxylic acid, isophthalic acid, or mixtures thereof; and
     (b) a diol component comprising at least 80 mole percent of residues of a diol containing 2 to 10 carbon atoms,
   wherein the diacid component is based on 100 mole percent of total diacid residues in the copolyester, and the diol component is based on 100 mole percent of total diol residues in the copolyester;
   wherein the force required to stretch a film of the copolyester (A) alone from 2× to 5× increases by less than 200% when the copolyester (A) film is stretched in the machine direction, in air, at 10 to 15° C. above the glass transition temperature of the copolyester (A); and
   wherein the polyester plasticizer (B) comprises:
     (a) a diol component comprising residues of a diol having 2 to 8 carbon atoms; and
     (b) a diacid component comprising residues of a dicarboxylic acid having 4 to 12 carbon atoms.

2. The polyester-based film according to statement 1, wherein the force increases by less than 150%, or less than 100%, or less than 50%.

3. The polyester-based film according to any of the foregoing statements, wherein
   (I) the copolyester (A) comprises (i) a diacid component comprising at least about 80 mole percent of the residues of terephthalic acid, naphthalenedicarboxylic acid, 1,4-cyclohexanedicarboxylic acid, isophthalic acid, or mixtures thereof; and (ii) a diol component comprising at least 80 mole percent of the residues of ethylene glycol, 1,4-cyclohexanedimethanol, diethylene glycol, neopentyl glycol, 2,2,4,4-tetramethyl-1,3-cyclobutanediol, or mixtures thereof; or (II) the copolyester (A) comprises (i) a diacid component comprising at least 80 mole percent of terephthalic acid residues, and (ii) a diol component comprising at least 80 mole percent of the residues of ethylene glycol and 1,4-cyclohexanedimethanol; or (III) the copolyester (A) comprises (i) a diacid component comprising at least 80 mole percent of terephthalic acid residues, and (ii) a diol component comprising 17 to 70 mole percent of the residues of 1,4-cyclohexanedimethanol and 30 to 83 mole percent of the residues of ethylene glycol; or (IV) the copolyester (A) comprises (i) a diacid component comprising at least 80 mole percent of terephthalic acid residues, and (ii) a diol component comprising 17 to 35 mole percent of the residues of 1,4-cyclohexanedimethanol and 65 to 83 mole percent of the residues of ethylene glycol; or (V) the copolyester (A) comprises (i) a diacid component comprising at least 80 mole percent of terephthalic acid residues, and (ii) a diol component comprising at least 80 mole percent of the residues of ethylene glycol, 1,4-cyclohexanedimethanol, and diethylene glycol; or (VI) the copolyester (A) comprises (i) a diacid component comprising at least 80 mole percent of terephthalic acid residues, and (ii) a diol component comprising at least 80 mole percent of residues of ethylene glycol and neopentyl glycol; or (VII) the copolyester (A) comprises (i) a diacid component comprising at least 80 mole percent of terephthalic acid residues, and (ii) a diol component comprising at least 80 mole percent of the residues of 1,4-cyclohexanedimethanol and 2,2,4,4-tetramethyl-1,3-cycobutanediol.

4. The polyester-based film according to any of the foregoing statements, wherein (I) the polyester plasticizer (B) comprises residues of phthalic acid, adipic acid, or mixtures thereof; and residues of 1,2-propanediol, 1,3-butanediol, 1,4-butanediol, or mixtures thereof; or (II) the polyester plasticizer (B) comprises residues of phthalic acid; and residues of 1,2-propanediol and 1,4-butanediol; or (III) the polyester plasticizer (B) comprises residues of phthalic acid and adipic acid; and residues of 1,2-propanediol and 1,3-butanediol; or (IV) the polyester plasticizer (B) comprises residues of adipic acid; and residues of 1,2-propanediol and 1,4-butanediol; or (V) the polyester plasticizer (B) comprises residues of adipic acid; and residues of 1,3-butanediol.

5. The polyester-based film according to any of the foregoing statements, wherein the plasticizer (B) has a $M_w$ of 900 to 6,000 g/mol, or 900 to 5,000 g/mol, or 900 to 4,000 g/mol, or 1,000 to 12,000 g/mol, or 1,000 to 6,000 g/mol, or 1,000 to 5,000 g/mol, or 1,000 to 4,000 g/mol, or 2,000 to 12,000 g/mol, or 2,000 to 6,000 g/mol, or 2,000 to 5,000 g/mol, or 2,000 to 4,000 g/mol.

6. The polyester-based film according to any of the foregoing statements, wherein the copolyester (A) has a minimum crystallization half-time ($t_{1/2}$ min) of at least 5 minutes, at least 8.6 minutes, at least 12 minutes, or at least 30 minutes.

7. The polyester-based film according to any of the foregoing statements, which comprises from 0.2 to 0.3% by weight of moisture, based on the total weight of the polyester-based film.

8. The polyester-based film according to any of the foregoing statements, wherein the blend has a glass transition temperature ($T_g$) of less than 70° C.

9. The polyester-based film according to any of the foregoing statements, wherein the blend has a glass transition temperature ($T_g$) of 60° C. or less.

10. The polyester-based film according to any of the foregoing statements, which has been stretched in an aqueous solution comprising boric acid and optionally a dye.

11. The polyester-based film according to any of the foregoing statements, which has been stretched at least 5× in the machine direction at a temperature of 60° C. or below.

12. The polyester-based film according to any of the foregoing statements, which has been stretched at least 7× in the machine direction at a temperature of 60° C. or below.

13. The polyester-based film according to any of the foregoing statements, wherein the blend comprises from 3 to 8% by weight of the polyester plasticizer (B), based on the total weight of the blend.

14. A laminate comprising:
(I) a polyvinyl alcohol-based film; and
(II) a polyester-based film according to any of the foregoing statements, with the proviso that the polyester-based film has not been stretched underwater.

15. The laminate according to statement 14, which has been stretched, in air, at least 5× in the machine direction at a temperature of 70° C. or below.

16. The laminate according to any of the foregoing laminate statements, which has been stretched, in an aqueous solution comprising boric acid and optionally a dye, at least 6× in the machine direction at a temperature of 60° C. or below.

17. The laminate according to any of the foregoing laminate statements, which has been stretched, in an aqueous solution comprising boric acid and optionally a dye, at least 7× in the machine direction at a temperature of 60° C. or below.

18. The laminate according to any of the foregoing laminate statements, wherein the polyvinyl alcohol-based film has a thickness of 10 μm or less after stretching.

19. The laminate according to any of the foregoing laminate statements, wherein the polyvinyl alcohol-based film has a thickness of 7 μm or less after stretching.

20. The laminate according to any of the foregoing laminate statements, wherein the polyvinyl alcohol-based film has a thickness of 5 μm or less after stretching.

21. The laminate according to any of the foregoing laminate statements, wherein the polyvinyl alcohol-based film, after stretching, has a single axis transmittance of at least 42%, a polarization degree of at least 99.95%, and a contrast ratio of at least 2000:1.

22. The laminate according to any of the foregoing laminate statements, which further comprises an adhesive layer between the polyvinyl alcohol-based film (I) and the polyester-based film (II).

23. A method of producing a thin-film polarizer, comprising: (i) forming a polyvinyl alcohol-based film (I) on a substrate comprising a polyester-based film (II) according to any of the foregoing polyester-based film statements, to obtain a laminate;
(ii) contacting the laminate with a dyeing liquid to dye the polyvinyl alcohol-based film (I);
(iii) stretching the laminate so that the polyvinyl alcohol-based film (I) has a thickness of 10 μm or less after stretching; and
(iv) separating the polyvinyl alcohol-based film (I) from the substrate to obtain a thin-film polarizer.

24. The method according to statement 23, wherein the stretching step (iii) is conducted, in air, at a stretch ratio of at least 5× in the machine direction and at a temperature of 70° C. or below.

25. The method according to any of the foregoing method statements, wherein the stretching step (iii) is conducted, in an aqueous solution comprising boric acid and optionally a dye, at a stretch ratio of at least 6× in the machine direction and at a temperature of 60° C. or below.

26. The method according to any of the foregoing method statements, wherein the stretching step (iii) is conducted, in an aqueous solution comprising boric acid and optionally a dye, at a stretch ratio of at least 7× in the machine direction and at a temperature of 60° C. or below.

27. The method according to any of the foregoing method statements, wherein the laminate further comprises an adhesive layer between the polyvinyl alcohol-based film (I) and the polyester-based film (II).

28. A polarizing plate which comprises the thin-film polarizer produced according to any of the foregoing method statements.

29. A display device which comprises the polarizing plate of statement 28.

30. A polyester-based film made from a blend comprising:
(A) a copolyester; and
(B) a polyester plasticizer having a weight-average molecular weight ($M_w$) of 900 to 12,000 g/mol.
wherein the polyester-based film has been stretched underwater;
wherein the copolyester (A) comprises:
  (a) a diacid component comprising at least 50 mole percent of residues of terephthalic acid, naphthalenedicarboxylic acid, 1,4-cyclohexanedicarboxylic acid, isophthalic acid, or mixtures thereof; and
  (b) a diol component comprising at least 80 mole percent of residues of a diol containing 2 to 10 carbon atoms,
wherein the diacid component is based on 100 mole percent of total diacid residues in the copolyester, and the diol component is based on 100 mole percent of total diol residues in the copolyester
wherein the polyester plasticizer (B) comprises:
  (a) a diol component comprising residues of a diol having 2 to 8 carbon atoms; and
  (b) a diacid component comprising residues of a dicarboxylic acid having 4 to 12 carbon atoms; and
wherein the copolyester (A) may be further characterized by one or more of the following features:
  (I) a film of the copolyester (A) by itself may have no more than 20%, no more than 15%, no more than 10%, no more than 5%, no more than 3%, or no more than 1% crystallinity when dry stretched up to 5× in the machine direction at a temperature of Tg+10° C. and at a strain rate of 100%, where Tg is the glass transition temperature of the copolyester (A);
  (II) the force required to dry stretch a 200 μm-thick film of the copolyester (A) by itself from 2× to 5× in the machine direction at a temperature of Tg+10° C. increases by no more than 30 N, no more than 20 N, or no more than 10 N;
  (III) a film of the copolyester (A) by itself has a degree of crystallinity of 20% or less, 15% or less, 10% or less, 5% or less, 3% or less, or 1% or less, after stretching;
  (IV) the copolyester (A) has a minimum crystallization half-time of at least 5 minutes, at least 7 minutes, at least 8.6 minutes, at least 10 minutes, at least 12 minutes, at least 30 minutes, or infinity; and
  (V) the copolyester (A) has a glass transition temperature (Tg) in the range of 40° C. to 70° C., 40° C. to 60° C., 50° C. to 70° C., 50° C. to 65° C., or 50° C. to 60° C.

31. Any of the statements 2-29, but substituting the statement 1 therein with the statement 30.

The subject matter of the present disclosure has been described in detail with reference to particular embodiments thereof, but it is understood that variations and modifications can be effected within the spirit and scope of this disclosure.

We claim:

1. A polyester-based film made from a blend comprising:
(A) a copolyester (A); and
(B) a polyester plasticizer (B) having a weight-average molecular weight ($M_w$) of 900 to 12,000 g/mol,
wherein the polyester-based film has been stretched underwater at least 6× its original length in the machine direction at a temperature of 60° C. or below without rupturing; and
wherein the underwater stretching is performed in one stage;
wherein the copolyester (A) comprises:
  (a) a diacid component comprising at least 50 mole percent of residues of terephthalic acid, naphthalenedicarboxylic acid, 1,4-cyclohexanedicarboxylic acid, isophthalic acid, or mixtures thereof; and
  (b) a diol component comprising at least 80 mole percent of residues of a diol containing 2 to 10 carbon atoms,
wherein the diacid component is based on 100 mole percent of total diacid residues in the copolyester, and the diol component is based on 100 mole percent of total diol residues in the copolyester;
wherein the force required to stretch a film of the copolyester (A) alone from 2× to 5× increases by less than 200%, where the copolyester (A) film is stretched in the machine direction, in air, at 10 to 15° C. above the glass transition temperature of the copolyester (A); and
wherein the polyester plasticizer (B) comprises:
  (a) a diol component comprising residues of a diol having 2 to 8 carbon atoms; and
  (b) a diacid component comprising residues of a dicarboxylic acid having 4 to 12 carbon atoms; and
wherein the copolyester (A) has a $T_g$ of up to 70° C.; and
wherein the copolyester (A) has a minimum crystallization half-time ($t_{1/2}$ min) of at least 8.6 minutes.

2. The polyester-based film according to claim 1, wherein the copolyester (A) has a minimum crystallization half-time ($t_{1/2}$ min) of at least-12 minutes.

3. The polyester-based film according to claim 1, which comprises from 0.2 to 0.3% by weight of moisture, based on the total weight of the polyester-based film.

4. The polyester-based film according to claim 1, wherein the blend has a glass transition temperature ($T_g$) of less than 70° C.

5. The polyester-based film according to claim 1, wherein the blend has a glass transition temperature ($T_g$) of 60° C. or less.

6. The polyester-based film according to claim 1, which has been stretched in an aqueous solution comprising boric acid and optionally a dye.

7. The polyester-based film according to claim 1, which has been stretched at least 7× in the machine direction at a temperature of 60° C. or below.

8. The polyester-based film according to claim 1, wherein the blend comprises from 3 to 8% by weight of the polyester plasticizer (B), based on the total weight of the blend.

9. A laminate comprising:
(I) a polyvinyl alcohol-based film (I); and
(II) a polyester-based film (II),
wherein the laminate has been stretched under water at least 6× in the machine direction at a temperature of 60° C. or below without rupturing; and
wherein the underwater stretching is performed in one stage; and
wherein the polyester-based film (II) is made from a blend comprising:
  (A) a copolyester (A); and
  (B) a polyester plasticizer (B) having a weight-average molecular weight ($M_w$) of 900 to 12,000 g/mol,
wherein the copolyester (A) comprises:
  (a) a diacid component comprising at least 50 mole percent of residues of terephthalic acid, naphthalenedicarboxylic acid, 1,4-cyclohexanedicarboxylic acid, isophthalic acid, or mixtures thereof; and
  (b) a diol component comprising at least 80 mole percent of residues of a diol containing 2 to 10 carbon atoms,
wherein the diacid component is based on 100 mole percent of total diacid residues in the copolyester, and the diol component is based on 100 mole percent of total diol residues in the copolyester;
wherein the force required to stretch a film of the copolyester (A) alone from 2× to 5× increases by less than 200% when the copolyester (A) film is stretched in the machine direction, in air, at 10 to 15° C. above the glass transition temperature of the copolyester (A); and
wherein the polyester plasticizer (B) comprises:
  (a) a diol component comprising residues of a diol having 2 to 8 carbon atoms; and
  (b) a diacid component comprising residues of a dicarboxylic acid having 4 to 12 carbon atoms; and
wherein the copolyester (A) has a $T_g$ of up to 70° C.; and
wherein the polyvinyl alcohol-based film, after stretching, has a single axis transmittance of at least 42%, a polarization degree of at least 99.95%, and a contrast ratio of at least 2000:1.

10. The laminate according to claim 9, which has been stretched, in an aqueous solution comprising boric acid and optionally a dye, at least 6× in the machine direction at a temperature of 60° C. or below.

11. The laminate according to claim 9, which has been stretched, in an aqueous solution comprising boric acid and optionally a dye, at least 7× in the machine direction at a temperature of 60° C. or below.

12. The laminate according to claim 9, wherein the polyvinyl alcohol-based film (I) has a thickness of 10 μm or less after stretching.

13. The laminate according to claim 9, wherein the polyvinyl alcohol-based film (I) has a thickness of 7 μm or less after stretching.

14. The laminate according to claim 9, wherein the polyvinyl alcohol-based film (I) has a thickness of 5 μm or less after stretching.

15. The laminate according to claim 9, which further comprises an adhesive layer between the polyvinyl alcohol-based film (I) and the polyester-based film (II).

16. A method of producing a thin-film polarizer, comprising:
(i) forming a polyvinyl alcohol-based film (I) on a substrate comprising a polyester-based film (II) to obtain a laminate;
(ii) contacting the laminate with a dyeing liquid to dye the polyvinyl alcohol-based film (I);
(iii) stretching the laminate so that the polyvinyl alcohol-based film (I) has a thickness of 10 μm or less after stretching; and
(iv) separating the polyvinyl alcohol-based film (I) from the substrate to obtain a thin-film polarizer,
wherein the polyester-based film (II) is made from a blend comprising:
  (A) a copolyester (A); and
  (B) a polyester plasticizer (B) having a weight-average molecular weight ($M_w$) of 900 to 12,000 g/mol,
wherein the polyester-based film has been stretched underwater at least 6× its original length in the machine direction at a temperature of 60° C. or below without rupturing; and
wherein the underwater stretching is performed in one stage;
wherein the copolyester (A) comprises:
  (a) a diacid component comprising at least 50 mole percent of residues of terephthalic acid, naphthalenedicarboxylic acid, 1,4-cyclohexanedicarboxylic acid, isophthalic acid, or mixtures thereof; and
  (b) a diol component comprising at least 80 mole percent of residues of a diol containing 2 to 10 carbon atoms,
wherein the diacid component is based on 100 mole percent of total diacid residues in the copolyester, and the diol component is based on 100 mole percent of total diol residues in the copolyester;
wherein the force required to stretch a film of the copolyester (A) alone from 2× to 5× increases by less than 200% when the copolyester (A) film is stretched in the machine direction, in air, at 10 to 15° C. above the glass transition temperature of the copolyester (A); and
wherein the polyester plasticizer (B) comprises:
  (a) a diol component comprising residues of a diol having 2 to 8 carbon atoms; and
  (b) a diacid component comprising residues of a dicarboxylic acid having 4 to 12 carbon atoms; and
wherein the copolyester (A) has a $T_g$ of up to 70° C.; and
wherein the copolyester (A) has a minimum crystallization half-time ($t_{1/2}$ min) of at least 8.6 minutes.

17. The method according to claim 16, wherein the stretching step (iii) is conducted, in an aqueous solution comprising boric acid and optionally a dye, at a stretch ratio of at least 6× in the machine direction and at a temperature of 60° C. or below.

18. The method according to claim 16, wherein the stretching step (iii) is conducted, in an aqueous solution comprising boric acid and optionally a dye, at a stretch ratio of at least 7× in the machine direction and at a temperature of 60° C. or below.

19. The method according to claim 16, wherein the laminate further comprises an adhesive layer between the polyvinyl alcohol-based film (I) and the polyester-based film (II).

20. A polarizing plate which comprises the thin-film polarizer produced according to the method of claim 16.

21. A display device which comprises the polarizing plate of claim 20.

* * * * *